(12) United States Patent
Michelli et al.

(10) Patent No.: US 7,949,427 B2
(45) Date of Patent: May 24, 2011

(54) METHODS AND APPARATUS FOR DISPENSING SOLID ARTICLES

(75) Inventors: Richard D. Michelli, Raleigh, NC (US); Edward J. Karwacki, Jr., Garner, NC (US)

(73) Assignee: PARATA Systems, LLC, Durham, NC (US)

( * ) Notice: Subject to any disclaimer, the term of this patent is extended or adjusted under 35 U.S.C. 154(b) by 578 days.

(21) Appl. No.: 12/052,301

(22) Filed: Mar. 20, 2008

(65) Prior Publication Data
US 2008/0283734 A1    Nov. 20, 2008

Related U.S. Application Data

(60) Provisional application No. 61/020,536, filed on Jan. 11, 2008, provisional application No. 60/938,936, filed on May 18, 2007.

(51) Int. Cl.
*G06F 17/00* (2006.01)

(52) U.S. Cl. .............. 700/236; 221/13; 221/64; 221/65; 250/222.1; 250/223 R; 250/224

(58) Field of Classification Search .................. 700/236; 221/64, 65, 13; 250/222.1, 222.2, 223 R, 250/224
See application file for complete search history.

(56) References Cited

U.S. PATENT DOCUMENTS

| | | | |
|---|---|---|---|
| 2,665,775 A | 1/1954 | Smith | |
| 2,708,996 A | 5/1955 | Skillman | |
| 2,865,532 A | 12/1958 | Smith | |
| 3,023,851 A | 3/1962 | Stiller | |
| 3,144,958 A | 8/1964 | Gumpertz | |
| 3,160,793 A | 12/1964 | Colburn | |
| 3,179,288 A | 4/1965 | Davy | |
| 3,185,851 A | 5/1965 | D'Emilio | |
| 3,196,276 A | 7/1965 | Naab | |
| 3,206,062 A | 9/1965 | Rappaport | |
| 3,310,199 A | 3/1967 | Roberts | |
| 3,312,372 A | 4/1967 | Cooper, Jr. | |
| 3,410,450 A | 11/1968 | Fortenberry | |
| 3,417,542 A | 12/1968 | Merrill | |
| 3,436,736 A | 4/1969 | Platt | |

(Continued)

FOREIGN PATENT DOCUMENTS

CA    936 501    11/1973

(Continued)

OTHER PUBLICATIONS

Notification of Transmittal of the International Search Report and the Written Opinion of the International Searching Authority, or the Declaration, PCT/US2008/005441, mailed Jul. 28, 2008.

*Primary Examiner* — Timothy R Waggoner
(74) *Attorney, Agent, or Firm* — Myers Bigel Sibley & Sajovec, PA

(57) ABSTRACT

According to embodiments of the present invention, a method for detecting solid articles using an apparatus including a sensor system is provided. The sensor system includes a radiation detector and a radiation emitter configured to direct radiation onto the radiation detector. The radiation detector is operative to generate detector signals proportional to the radiation received thereby. The method includes moving the radiation emitter and/or the radiation detector relative to the other. According to some embodiments, the solid articles are solid pharmaceutical articles.

45 Claims, 18 Drawing Sheets

U.S. PATENT DOCUMENTS

| | | | |
|---|---|---|---|
| 3,556,342 A | 1/1971 | Guarr | |
| 3,599,152 A | 8/1971 | Williams | |
| 3,653,176 A | 4/1972 | Gess | |
| 3,730,388 A | 5/1973 | Bender | |
| 3,732,544 A | 5/1973 | Obland | |
| 3,780,907 A | 12/1973 | Colburn | |
| 3,815,780 A | 6/1974 | Bauer | |
| 3,837,139 A | 9/1974 | Roseberg | |
| 3,885,702 A * | 5/1975 | Joslin et al. | 221/174 |
| 3,917,045 A | 11/1975 | Williams | |
| 4,267,942 A | 5/1981 | Wick | |
| 4,434,602 A | 3/1984 | Culpepper | |
| 4,481,667 A | 11/1984 | Price et al. | |
| 4,546,901 A | 10/1985 | Buttarazzi | |
| 4,573,606 A | 3/1986 | Lewis | |
| 4,655,026 A | 4/1987 | Wigoda | |
| 4,664,289 A | 5/1987 | Shimizu | |
| 4,674,259 A | 6/1987 | Hills | |
| 4,674,651 A | 6/1987 | Scidmore | |
| 4,693,057 A | 9/1987 | Rittinger | |
| 4,695,954 A | 9/1987 | Rose | |
| 4,741,428 A | 5/1988 | Taniguchi et al. | |
| 4,766,542 A | 8/1988 | Pilarczyk | |
| 4,767,023 A | 8/1988 | Hackmann | |
| 4,801,044 A | 1/1989 | Kubota et al. | |
| 4,805,377 A | 2/1989 | Carter | |
| 4,836,682 A | 6/1989 | Keenan, III | |
| 4,869,392 A | 9/1989 | Moulding, Jr. | |
| 4,918,604 A | 4/1990 | Baum | |
| 4,971,513 A | 11/1990 | Bergerioux | |
| 4,980,292 A | 12/1990 | Elbert | |
| 4,984,709 A | 1/1991 | Weinstein | |
| 5,018,644 A | 5/1991 | Hackmann | |
| 5,047,948 A | 9/1991 | Turner | |
| 5,149,921 A * | 9/1992 | Picado | 187/317 |
| 5,337,919 A | 8/1994 | Spaulding et al. | |
| 5,393,973 A * | 2/1995 | Blau | 250/221 |
| 5,502,312 A | 3/1996 | Lorenzo | |
| 5,668,300 A | 9/1997 | Krökel et al. | |
| 5,768,327 A | 6/1998 | Pinto et al. | |
| 5,777,557 A | 7/1998 | Fayfield | |
| 5,808,296 A | 9/1998 | McMonagle et al. | |
| 5,923,427 A | 7/1999 | Dong | |
| 6,006,946 A | 12/1999 | Williams et al. | |
| 6,036,812 A | 3/2000 | Williams et al. | |
| 6,176,392 B1 | 1/2001 | Williams et al. | |
| 6,211,784 B1 | 4/2001 | Nishide | |
| RE37,829 E | 9/2002 | Charhut | |
| 6,492,821 B1 | 12/2002 | Marko et al. | |
| 6,592,005 B1 | 7/2003 | Coughlin et al. | |
| 6,631,826 B2 * | 10/2003 | Pollard et al. | 221/156 |
| 6,707,028 B2 * | 3/2004 | Housh et al. | 250/222.1 |
| 6,736,286 B2 | 5/2004 | Hashimoto et al. | |
| 6,971,541 B2 | 12/2005 | Williams et al. | |
| 7,446,302 B2 * | 11/2008 | Mason et al. | 250/222.1 |
| 7,508,512 B1 * | 3/2009 | Rollins et al. | 356/399 |
| 2003/0015555 A1 | 1/2003 | Pollard et al. | |
| 2004/0004085 A1 | 1/2004 | Williams et al. | |
| 2004/0204791 A1 | 10/2004 | Hair, III et al. | |
| 2006/0241807 A1 | 10/2006 | Daniels et al. | |

FOREIGN PATENT DOCUMENTS

| | | |
|---|---|---|
| GB | 1 168 758 | 10/1969 |
| GB | 1 411 951 | 10/1975 |
| JP | 51-000792 B | 1/1976 |
| JP | 52-047400 | 4/1977 |
| JP | 61-104904 | 5/1986 |
| JP | 63-208410 | 8/1988 |
| JP | 64-028102 | 1/1989 |
| JP | 1-288265 | 11/1989 |
| JP | 2-028417 | 1/1990 |

* cited by examiner

METHODS AND APPARATUS FOR DISPENSING SOLID ARTICLES

RELATED APPLICATION(S)

The present application claims the benefit of U.S. Provisional Patent Application Ser. No. 61/020,536, filed Jan. 11, 2008, and U.S. Provisional Patent Application Ser. No. 60/938,936, filed May 18, 2007, the disclosures of which are incorporated herein by reference in their entireties.

FIELD OF THE INVENTION

The present invention is directed generally to the dispensing of solid articles and, more specifically, is directed to the automated dispensing of solid articles, such as solid pharmaceutical articles.

BACKGROUND OF THE INVENTION

Pharmacy generally began with the compounding of medicines which entailed the actual mixing and preparing of medications. Heretofore, pharmacy has been, to a great extent, a profession of dispensing, that is, the pouring, counting, and labeling of a prescription, and subsequently transferring the dispensed medication to the patient. Because of the repetitiveness of many of the pharmacist's tasks, automation of these tasks has been desirable.

Some attempts have been made to automate the pharmacy environment. For example, U.S. Pat. No. 6,971,541 to Williams et al. describes an automated system for dispensing pharmaceuticals using dispensing bins. Each dispensing bin includes a hopper in which tablets are stored and a dispensing channel fluidly connecting the hopper to a dispensing outlet. Forward and reverse air flows are used to selectively convey the tablets through the dispensing channel in each of a dispensing direction (toward the outlet) and a reverse direction (toward the hopper). A counting sensor is positioned proximate the outlet of the dispensing channel and used to detect tablets passing the sensor in order to maintain a count of the tablets dispensed.

SUMMARY OF THE INVENTION

According to embodiments of the present invention, a method for detecting solid articles using an apparatus including a sensor system is provided. The sensor system includes a radiation detector and a radiation emitter configured to direct radiation onto the radiation detector. The radiation detector is operative to generate detector signals proportional to the radiation received thereby. The method includes moving the radiation emitter and/or the radiation detector relative to the other. According to some embodiments, the solid articles are solid pharmaceutical articles.

According to some embodiments, the method includes adjusting a radiation output of the radiation emitter to compensate for the relative positions of the radiation emitter and the radiation detector. According to some embodiments, the method includes adjusting the radiation output of the radiation emitter to compensate for a change in the amount of radiation incident on the radiation detector from the radiation emitter caused by moving the radiation emitter and/or the radiation detector relative to the other.

According to embodiments of the present invention, an apparatus for detecting solid articles includes a sensor system. The sensor system includes a radiation detector and a radiation emitter configured to direct radiation onto the radiation detector. The radiation detector is operative to generate detector signals proportional to the radiation received thereby. The radiation emitter and/or the radiation detector are mounted for movement relative to the other.

According to some embodiments, the apparatus further includes a controller configured to adjust a radiation output of the radiation emitter to compensate for the relative positions of the radiation emitter and the radiation detector.

According to embodiments of the present invention, a computer program product for detecting solid articles includes a computer readable storage medium having computer readable program code embodied in the medium. The computer readable program code includes computer readable program code configured to adjust a radiation output of a radiation emitter to compensate for a change in an amount of radiation incident on a radiation detector from the radiation emitter caused by moving the radiation emitter and/or the radiation detector relative to the other.

According to embodiments of the present invention, an apparatus for dispensing and detecting solid articles includes a housing and a sensor system. The housing defines a dispensing pathway. The sensor system includes a radiation detector and a radiation emitter. The radiation detector is positioned along the dispensing pathway. The radiation detector has a primary reception axis and a reception field. The radiation emitter is positioned along the dispensing pathway and configured to direct radiation onto the radiation detector. The radiation emitter has a primary emission axis and an emission field. The emission field and the reception field overlap across the dispensing pathway to define a sensing area. The primary reception axis and the primary emission axis are offset from one another a distance transverse to the dispensing pathway. The radiation detector is operative to generate detector signals proportional to the radiation received thereby.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
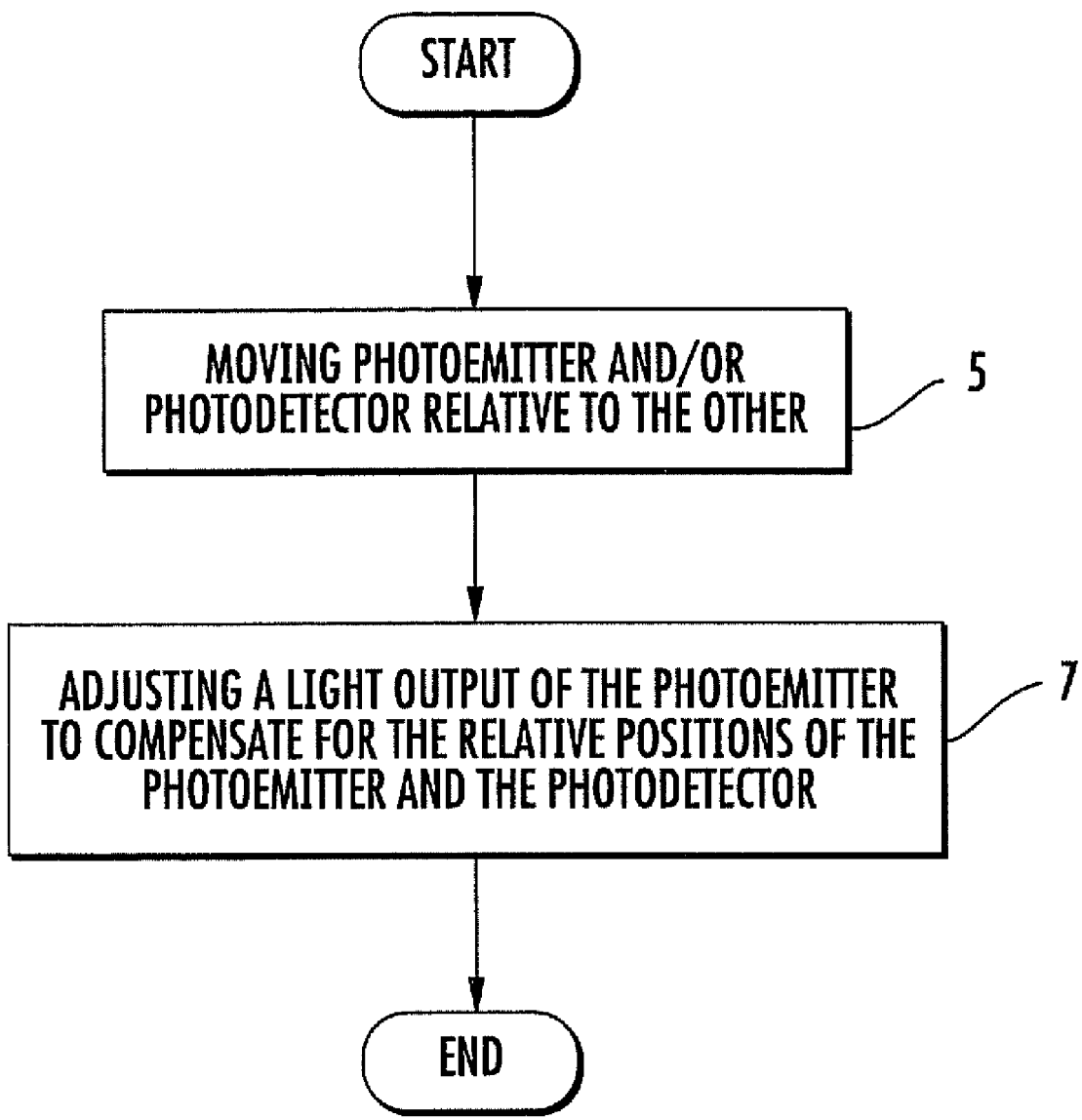
FIG. 1 is a flow chart illustrating operations according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "transverse" means across and nonparallel to a related axis, direction or the like. For example, an axis that is referred to as transverse to another axis extends across and at an angle with respect to the other axis. Transverse can include perpendicular, but is not limited thereto.

In accordance with embodiments of the present invention, apparatus and methods are provided for dispensing solid articles. According to some embodiments, the solid articles are solid pharmaceutical articles. In particular, such methods and apparatus may be used to dispense pharmaceutical pills or tablets.

According to embodiments of the present invention, an apparatus for dispensing and detecting solid articles, such as pharmaceutical articles, includes a housing that defines a dispensing channel. A radiation detector (e.g., a photodetector) and a radiation emitter (e.g., a photoemitter) are positioned along the dispensing channel. The radiation emitter directs radiation (e.g., light) across the channel and onto the radiation detector, which is operative to generate detector signals proportional to the received radiation. The radiation detector is offset from the radiation emitter.

Apparatus as described according to embodiments of the present invention can provide more consistent and reliable detection of articles passing through the dispensing channel. More particularly, the offset between the radiation detector and the radiation emitter may provide a sensing area having a location and/or geometry relative to the geometry of the dispensing channel that serves to reduce or minimize the size and/or presence of sensing blind spots. As used herein, sensing area blind spot refers to a position or region of the lateral cross-section of the dispensing channel that is outside of the effective sensing area cooperatively defined by the radiation detector and the radiation emitter. In practice, blind spots of sufficient size and shape may permit pharmaceutical articles (or fragments thereof) to pass by the radiation detector without intersecting (at all or sufficiently) the sensing area to occlude the radiation directed from the radiation emitter to the radiation detector.

With reference to FIG. 1, operations according to further embodiments of the present invention use an apparatus including a sensor system that includes a radiation detector and a radiation emitter configured to direct light onto the radiation detector, the radiation detector being operative to generate detector signals proportional to the light received thereby. The method includes moving the radiation emitter and/or the radiation detector relative to the other (Block 5). According to some embodiments, the method includes adjusting a light output of the radiation emitter to compensate for the relative positions of the radiation emitter and the radiation detector (Block 7). According to some embodiments, the method includes adjusting the radiation output of the radiation emitter to compensate for a change in the amount of radiation incident on the radiation detector from the radiation emitter caused by moving the radiation emitter and/or the radiation detector relative to the other.

According to some embodiments, the radiation emitter is a photoemitter, the radiation detector is a photodetector, and the radiation is light.

According to some embodiments, the radiation detector and the radiation emitter are mounted on different respective walls defining a dispensing channel and one or both of the respective walls are relatively moved to change a dimension of the dispensing channel, thereby relatively moving the radiation detector and/or the radiation emitter.

Methods and apparatus of the present invention may provide improved flexibility in the arrangement and range of movement of components defining a dispensing channel for directing pharmaceutical articles. The radiation detector and radiation emitter may be mounted on movable walls defining the dispensing channel to provide better and more consistent positioning with respect to the passing articles. By compensating for variation in the amount of radiation received by the radiation detector from the radiation emitter, inconsistencies and/or degradation in detection performance caused by altering the geometry or relative positions of the radiation detector and the radiation emitter to adjust the dispensing channel dimensions can be prevented or reduced.

Figure 2:
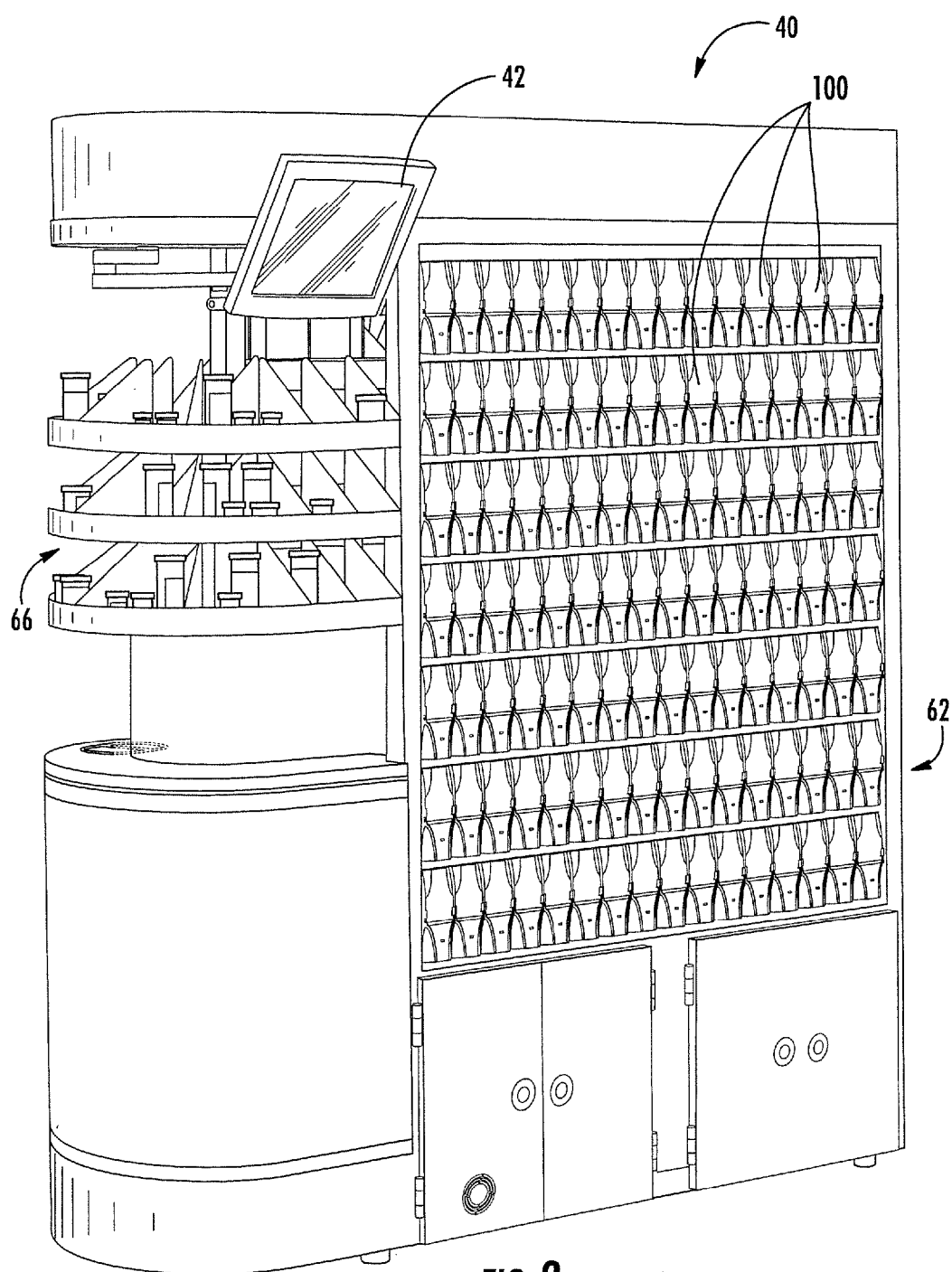
FIG. 2 is a perspective view of a pharmaceutical tablet dispensing system including a sensor system according to some embodiments of the present invention.
Figure 3:
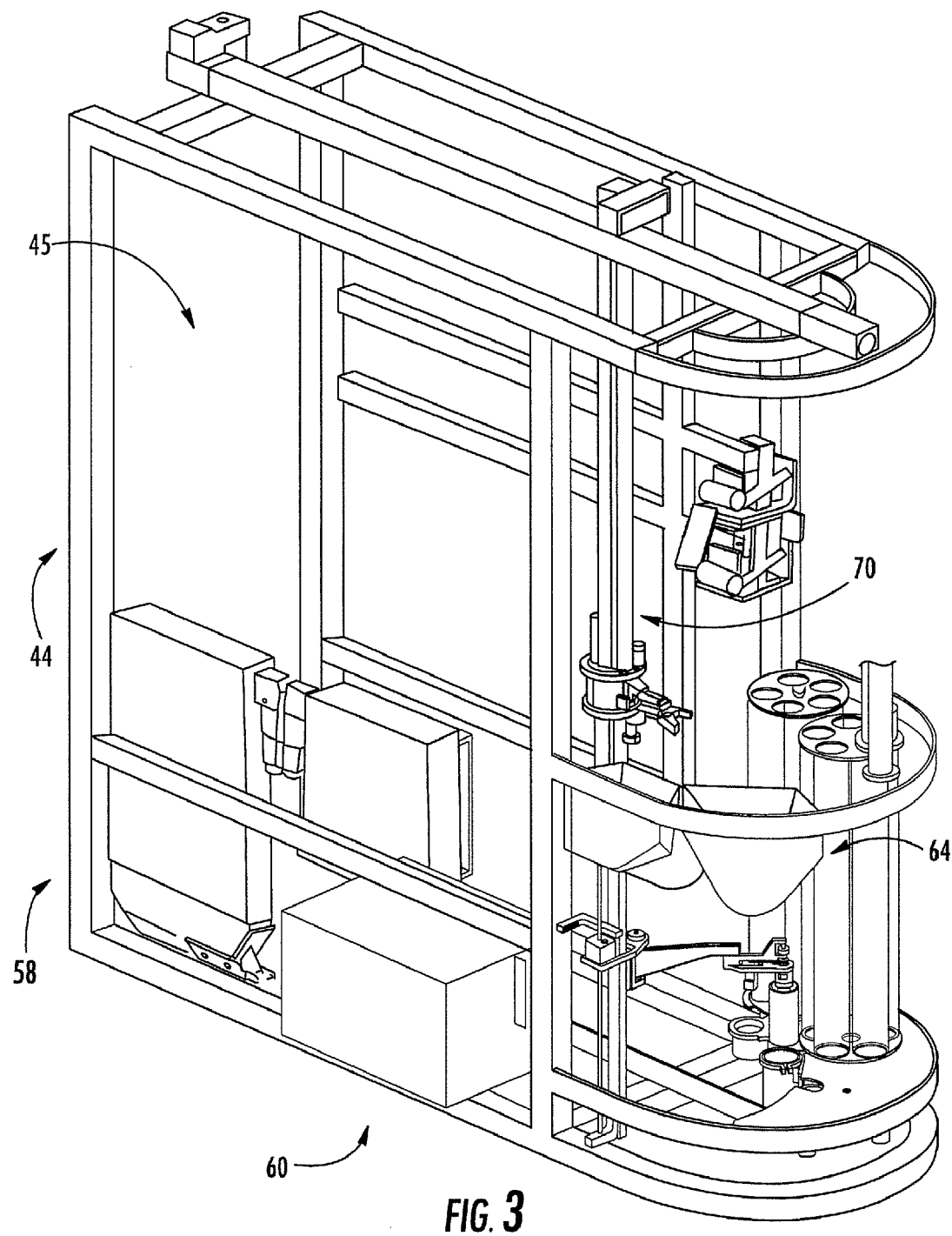
FIG. 3 is a cutaway view of the tablet dispensing system of FIG. 2 illustrating a container dispensing station, a labeling carrier, a dispensing carrier, and a closure dispensing station thereof.
Figure 4:
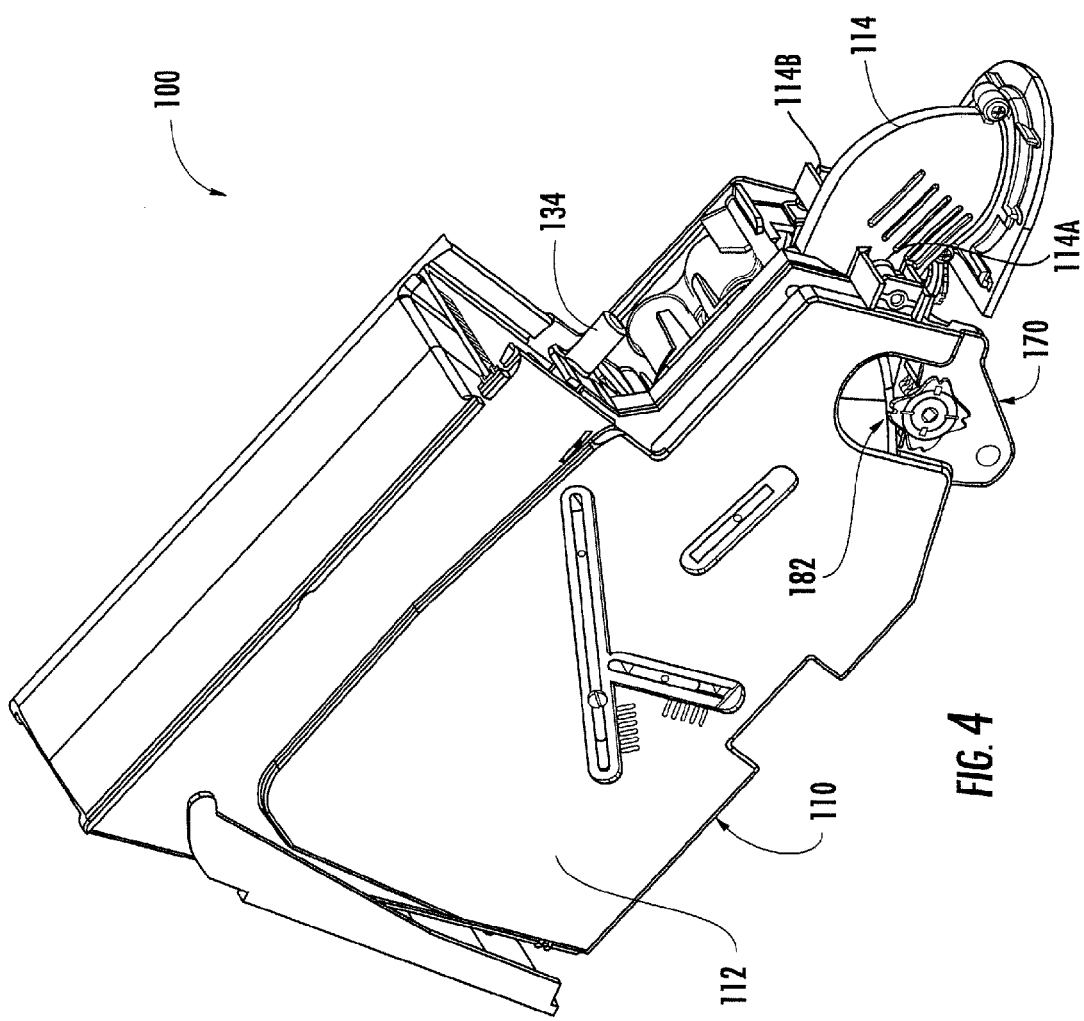
FIG. 4 is a front, left perspective view of a dispensing bin according to some embodiments of the present invention forming a part of the tablet dispensing system of FIG. 2.
Figure 5:
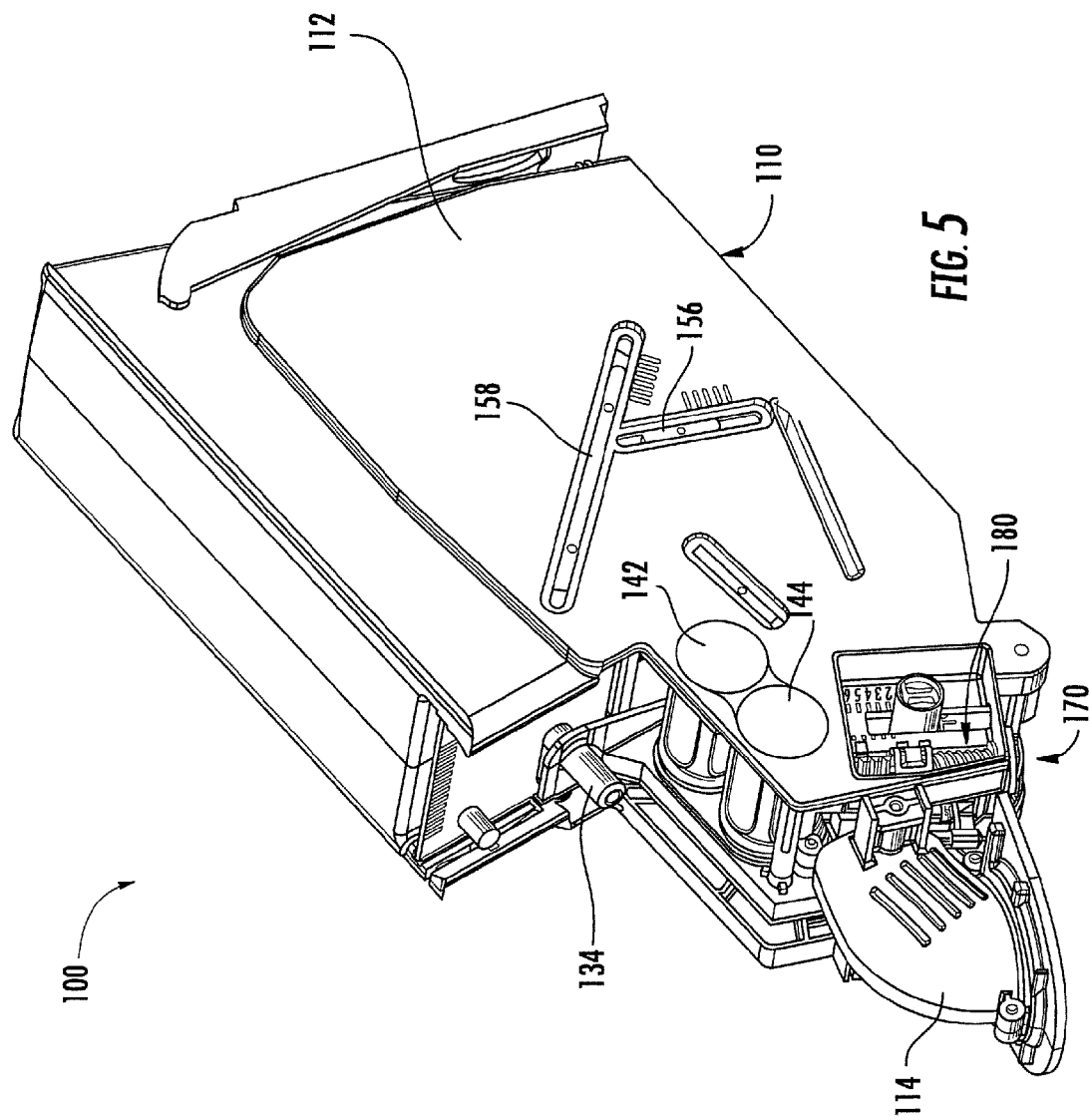
FIG. 5 is a front, right perspective view of the dispensing bin of FIG. 4.

A dispensing system according to embodiments of the present invention and that can carry out the foregoing methods is illustrated in FIGS. 2-12 and designated broadly therein at 40 (FIGS. 2 and 3). The dispensing system 40 includes a sensor system 102 (FIG. 6) according to some embodiments of the present invention. The dispensing system 40 includes a support frame 44 for the mounting of its various components. Those skilled in this art will recognize that the frame 44 illustrated herein is exemplary and can take many configurations that would be suitable for use with the present invention. The frame 44 provides a strong, rigid foundation to which other components can be attached at desired locations, and other frame forms able to serve this purpose may also be acceptable for use with this invention.

The system 40 generally includes as operative stations a controller (represented herein by a graphical user interface 42), a container dispensing station 58, a labeling station 60, a tablet dispensing station 62, a closure dispensing station 64, and an offloading station 66. In the illustrated embodiment, containers, tablets and closures are moved between these stations with a dispensing carrier 70; however, in some embodiments, multiple carriers are employed. The dispensing carrier 70 has the capability of moving the container to designated locations within the cavity 45 of the frame 44. Except as discussed herein with regard to the dispensing station 62, each of the operative stations and the conveying devices may be of any suitable construction such as those described in detail in U.S. Pat. No. 6,971,541 to Williams et al. and/or U.S. Patent Publication No. US-2006-0241807-A1, the disclosures of which are hereby incorporated herein in their entireties.

The controller 42 controls the operation of the remainder of the system 40. In some embodiments, the controller 42 will be operatively connected with an external device, such as a personal or mainframe computer, that provides input information regarding prescriptions. In other embodiments, the controller 42 may be a stand-alone computer that directly receives manual input from a pharmacist or other operator. An exemplary controller is a conventional microprocessor-based personal computer.

In operation, the controller 42 signals the container dispensing station 58 that a container of a specified size is desired. In response, the container dispensing station 58 delivers a container for retrieval by the carrier 70. From the container dispensing station 58, the container is moved to the labeling station 60 by the carrier 70. The labeling station 60 includes a printer that is controlled by the controller 42. The printer prints and presents an adhesive label that is affixed to the container.

Figure 6:
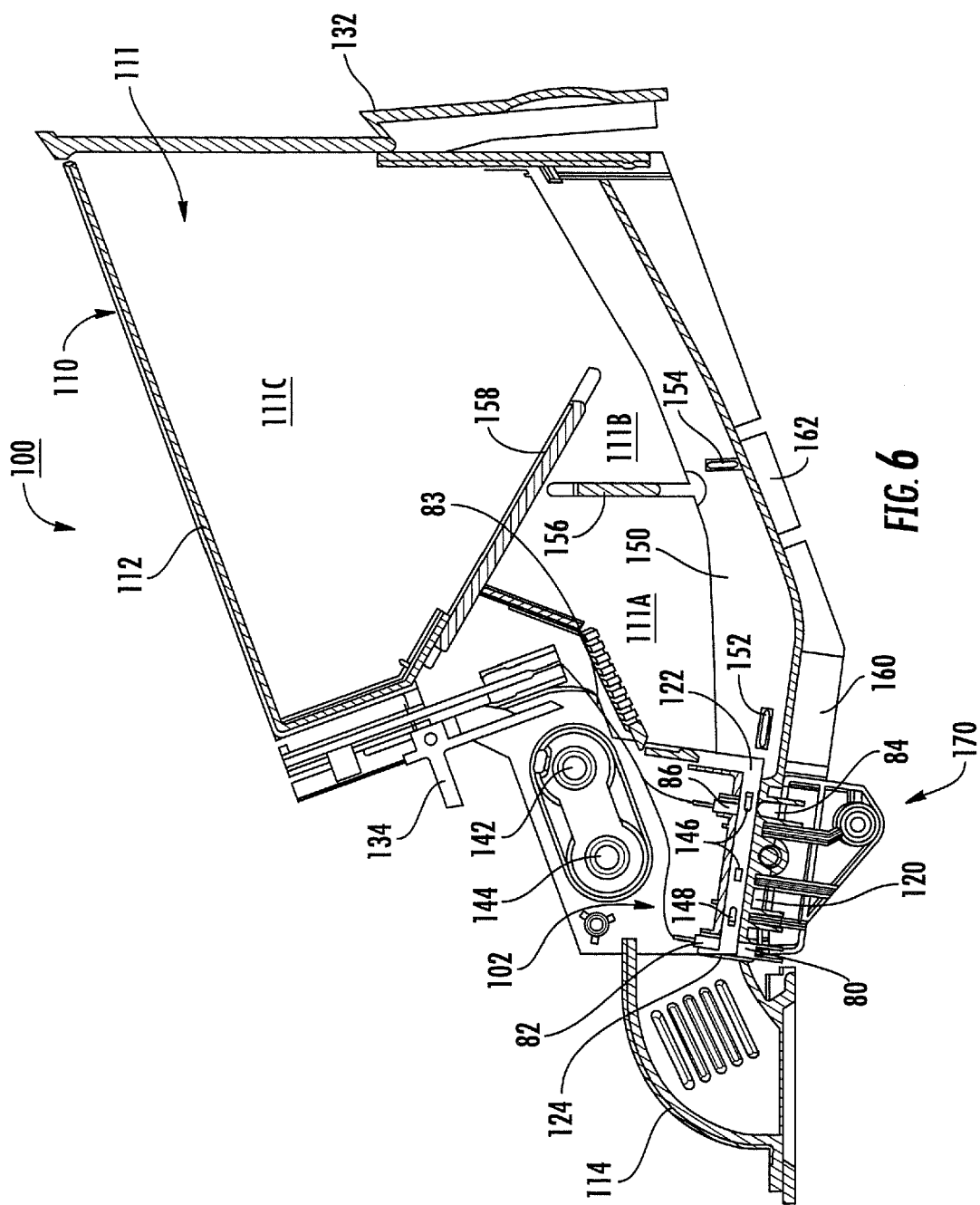
FIG. 6 is a cross-sectional view of the bin of FIG. 4.

Filling of labeled containers with tablets is carried out by the tablet dispensing station 62. The tablet dispensing station 62 comprises a plurality of tablet dispensing bin assemblies or bins 100 (described in more detail below), each of which holds a bulk supply of individual tablets (typically the bins 100 will hold different tablets). Referring to FIGS. 2 and 6, the dispensing bins 100, which may be substantially identical in size and configuration, are organized in an array mounted on the rails of the frame 44. Each dispensing bin 100 has a dispensing passage or channel 120 with an outlet 124 that faces generally in the same direction to create an access region for the dispensing carrier 70. The identity of the tablets in each bin is known by the controller 42, which can direct the dispensing carrier 70 to transport the container to the proper bin 100. In some embodiments, the bins 100 may be labeled with a bar code or other indicia to allow the dispensing carrier 70 to confirm that it has arrived at the proper bin 100.

The dispensing bins 100 are configured to singulate, count, and dispense the tablets contained therein, with the operation of the bins 100 and the counting of the tablets being controlled by the controller 42. Some embodiments may employ the controller 42 as the device which monitors the locations and contents of the bins 100; others may employ the controller 42 to monitor the locations of the bins, with the bins 100 including indicia (such as a bar code or electronic transmitter) to identify the contents to the controller 42. In still other embodiments, the bins 100 may generate and provide location and content information to the controller 42, with the result that the bins 100 may be moved to different positions on the frame 44 without the need for manual modification of the controller 42 (i.e., the bins 100 will update the controller 42 automatically).

Any of a number of dispensing units that singulate and count discrete objects may be employed if suitably modified to include the inventive aspects disclosed herein. In particular, dispensing units that rely upon targeted air flow and a singulating nozzle assembly may be used, such as the devices described in U.S. Pat. No. 6,631,826 to Pollard et al., U.S. Patent Publication No. US-2006-0241807-A1, U.S. patent application Ser. No. 11/750,710, and/or U.S. patent application Ser. No. 11/834,936, each of which is hereby incorporated herein by reference in its entirety. Bins of this variety may also include additional features, such as those described below.

After the container is desirably filled by the tablet dispensing station 62, the dispensing carrier 70 moves the filled container to the closure dispensing station 64. The closure dispensing station 64 may house a bulk supply of closures and dispense and secure them onto a filled container. The dispensing carrier 70 then moves to the closed container, grasps it, and moves it to the offloading station 66.

Turning to the bins 100 in more detail, an exemplary bin 100 is shown in more detail in FIGS. 4-12. The bin 100 includes a housing 110 having a hopper portion 112 and a nozzle 114. The bin 100 is fluidly connected with a pressurized gas source 136 (FIG. 7) as discussed in more detail below.

Referring to FIG. 6, the hopper portion 112 defines a hopper chamber 111 that can be filled with tablets T. The bin 100 can be filled or replenished with tablets through an opening located at the upper rear portion of the bin 100. The opening is selectively accessible via a pivoting door 132, for example.

The tablets T can be dispensed one at a time into the container C (FIG. 7) through the dispensing channel 120. The dispensing channel 120 has an inlet 122 adjacent and fluidly connecting the channel 120 to the hopper chamber 111. The dispensing channel 120 includes the outlet 124 downstream from and opposite the inlet 122 and through which tablets may exit to be dispensed into the container C. The bin 100 defines a tablet dispensing path from the inlet 122, through the dispensing channel 120, through the outlet 124, and through the nozzle 114.

The hopper portion 112 has a bottom wall defining a floor 150. The floor 150 has a sloped rear portion that slopes downwardly toward the inlet 122. The floor 150 also has a funnel-shaped front portion. A front agitation port or outlet 152 and a rear agitation port or outlet 154 are provided in the floor 150. As discussed below, air or other pressurized gas can be flowed through the outlets 152, 154 and into the hopper chamber 111 to agitate the tablets T contained therein.

A front partition or divider wall 156 extends through the hopper chamber 111 and forms a gap or choke point between the lower edge of the wall 156 and the floor 150. According to some embodiments, the choke point has a gap spacing or height from the floor 150 of between about 0.25 and 0.75 inch. The position of the wall 156, and thereby the gap spacing, may be selectively adjusted using an adjustment mechanism.

A rear partition or divider wall 158 extends through the hopper chamber 111 and forms a gap or choke point between the lower edge of the wall 158 and the floor 150. According to some embodiments, the choke point has a gap spacing or height from the floor 150 of between about 0.6 and 1 inch. The position of the wall 158, and thereby the gap spacing, may be selectively adjusted using an adjustment mechanism. According to some embodiments, the rear divider wall 158 forms an angle of at least about 30 degrees with respect to horizontal and, according to some embodiments, between about 30 and 45 degrees with respect to horizontal.

The front divider wall 156 and rear divider wall 158 divide the hopper chamber 111 into subchambers or regions. More particularly and referring to FIG. 6, a front region or subchamber 111A is defined between the divider wall 156 and the inlet 122, an intermediate region or subchamber 111B is defined between the front divider wall 156 and the rear divider wall 158, and a rear region or subchamber 111C is defined between the rear divider wall 158 and the rear wall of the bin 100.

The housing 110 further includes a high pressure supply port or nozzle 134. In use, the pressurized gas source 136 (FIG. 7) is fluidly connected to the high pressure nozzle 134 via a manifold, fitting, flexible or rigid conduit, or the like. The gas source 136 may include a compressor or a container of compressed gas, for example. The high pressure gas source 136 is operative to provide a supply gas flow of a suitable working gas at a high pressure to the nozzle 134. According to some embodiments, the supplied gas is or includes air. According to some embodiments, the pressure of the supplied gas at the nozzle 134 is at least about 10 psi and, according to some embodiments, between about 10 and 60 psi.

A gas supply passage or conduit fluidly connects the high pressure nozzle 134 to a forward control valve 142 (FIG. 6). Two forward jet supply passages fluidly connect the forward control valve 142 to respective forward drive jet apertures or outlets 146. The forward jet outlets 146 are positioned and configured to direct air or other supplied gas into the dispensing channel 120. A front agitation supply passage fluidly connects the forward control valve 142 to a front air amplifier 160. The front air amplifier 160 is positioned and configured to direct air or other supplied gas into the hopper chamber 111 through the front agitation outlet 152. The forward control valve 142 is operable to control airflow to the forward jet outlets 146 and the front air amplifier 160.

A further gas supply passage or conduit fluidly connects the high pressure nozzle 134 to a reverse control valve 144 (FIG. 6). A reverse jet supply passage fluidly connects the reverse control valve 144 to a reverse drive jet aperture or outlet 148. The reverse jet outlet 148 is positioned and configured to direct air or other supplied gas into the dispensing channel 120. A rear agitation supply passage fluidly connects the reverse control valve 144 to a rear air amplifier 162. The rear air amplifier 162 is positioned and configured to direct air or other supplied gas into the hopper chamber 111 through the rear agitation outlet 154. The reverse control valve 144 is operable to control airflow to the reverse jet outlet 148 and the rear air amplifier 162.

In use, the air amplifiers 160, 162 can be used to convert a supplied pressurized gas flow having a given pressure, velocity and mass flow rate into an exiting or output air flow having a comparatively lower pressure, higher velocity, and higher mass flow rate. According to some embodiments, the air amplifiers 160, 162 utilize the Coanda effect. The outlets of the air amplifiers 160, 162 are positioned in or adjacent the agitation outlets 152, 154, respectively, so that the exit gas flow enters the hopper chamber 111 through the agitation outlets 152, 154. The air amplifiers 160, 162 may be constructed and/or operate in the manner disclosed in U.S. patent application Ser. No. 11/750,710, the disclosure of which is incorporated herein by reference. Each of the air amplifiers 160, 162 may be secured to the housing 110.

According to some embodiments and as illustrated, the drive jet outlets 146, 148 and the agitation outlets 152, 154 are fluidly connected to the pressurized gas source 136 via the same intake (i.e., the nozzle 134). According to some embodiments, a single gas source is used to supply all drive jet outlets and agitation outlets. According to some embodiments, the pressure of the gas supplied to each air amplifier 160, 162 is substantially the same as the pressure of the gas supplied to each drive jet outlet 146, 148.

Alternative mechanisms may be used to provide the agitation gas flows discussed herein. For example, the system 40 may provide agitation flow using a separate low pressure manifold as disclosed in U.S. Patent Publication No. US-2006-0241807-A1.

With reference to FIGS. 4, 5, 7 and 9-12, the bin 100 further includes an adjustable dispensing channel subassembly 170. The subassembly 170 includes a fixed side wall 117, a ceiling member 172, a floor member 174, a follower side wall 176, a dispensing channel height adjustment mechanism 180, and a dispensing channel width adjustment mechanism 182.

The fixed side wall 117 is fixed with respect to and may be secured to or integrally formed with the housing 110. The jets 146, 148 are formed in the fixed side wall 117.

The floor member 174 includes a floor wall 174A. The floor member 174 is movable (e.g., slidable) left and right along an axis W-W relative to the fixed side wall 117. The floor wall 174A can be selectively moved relative to the fixed side wall 117 and set using the adjustment mechanism 182. The follower side wall 176 slides left and right with the floor wall 174A so that the lateral spacing between the follower side wall 176 and the fixed side wall 117 can be changed and set using the adjustment mechanism 182. Photoemitter mount bores 174C, 174D (FIG. 7) are defined in the floor wall 174A.

The ceiling member 172 includes a ceiling wall 172A and a side wall 172B. The ceiling member 172 is movable (e.g., slidable) up and down along an axis H-H relative to the fixed side wall 117 and the floor wall 174A. The heightwise spacing between the ceiling wall 172A and the floor wall 174A can be selectively changed and set using the adjustment mechanism 180. The follower side wall 176 slides up and down relative to the floor member 174 to accommodate repositioning of the ceiling member 172. Photodetector mount bores 172C, 172D (FIG. 7) are defined in the ceiling wall 172A.

As illustrated, the adjustment mechanisms 180, 182 each comprise a thumbscrew adjuster 180A, 182A rotatably fixed in the housing 110 and operatively engaging threaded bores of the ceiling member 172 and the floor member 174, respectively. However, other types of adjustment mechanisms may be used.

The fixed side wall 117, the ceiling wall 172A, the floor wall 174A, and the follower side wall 176 together define the dispensing channel 120, the inlet 122, and the outlet 124. The heightwise and widthwise dimensions of the dispensing channel 120, the inlet 122, and the outlet 124 can be selectively configured using the adjustment mechanisms 180, 182.

With reference to FIG. 6, the sensor system 102 includes an exit photoemitter 80, an exit photosensor or photodetector 82, an entrance photoemitter 84, an entrance photosensor or photodetector 86, the controller 42, and an emitter driver operative to monitor flow of tablets T through the dispensing channel 120. The photoemitter 80 and the photosensor 82 may cooperate as a first sensor pair and the photoemitter 84 and the photosensor 86 may cooperate as a second sensor pair. Additionally, the first and second sensor pairs may be cooperatively used or monitored as disclosed in U.S. patent application Ser. No. 11/834,936, the disclosure of which is incorporated herein by reference.

The photodetector 82 is mounted in the bore 172C (FIG. 7) of the ceiling wall 172A for movement with the wall 172A. The photoemitter 80 is mounted in the bore 174C (FIG. 7) of the floor wall 174A for movement with the wall 174A. The photodetector 82 and the photoemitter 80 are each positioned along and face the dispensing channel 120. According to some embodiments, the photodetector 82 and the photoemitter 80 are each positioned proximate (and, in some embodiments, at, in or immediately adjacent) the outlet 124.

The photodetector 86 is mounted in the bore 172D of the ceiling wall 172A for movement with the wall 172A. The photoemitter 84 is mounted in the bore 174D of the floor wall 174A for movement with the wall 174A. The photodetector 86 and the photoemitter 84 are each positioned along and face the dispensing channel 120. According to some embodiments, the photodetector 86 and the photoemitter 84 are each positioned proximate (and, in some embodiments, at, in or immediately adjacent) the inlet 122.

According to some embodiments, the photoemitters 80, 84 are photoelectric emitters and the photodetectors 82, 86 are photoelectric sensors. According to some embodiments, the photoemitters 80, 84 are infrared (IR) emitters and the photodetectors 82, 86 are IR photosensors. According to some embodiments, the photoemitters 80, 84 are ultraviolet (UV) emitters and the photodetectors 82, 86 are UV photodetectors. According to some embodiments, the components 80, 82, 84, 86 may each include both a photoemitter and a photodetector, whereby the components 80, 82, 84, 86 may each serve as an emitter and a sensor, each configured to emit toward and receive from the other in its sensor pair. According to some embodiments, the components 80, 84 may each be replaced with a retroreflective photoemitter/photodetector device and the components 82, 86 may each be a cooperating reflector. Other combinations and configurations including a photoemitter and an associated photodetector may be employed. For the purpose of explanation, the illustrated embodiment will be described with only the components 82, 86 being a photodetector (i.e., the photodetectors 82, 86 receive photoemissions from the photoemitters 80, 84, respectively).

According to still further embodiments, the photoemitters 80, 84 and the photodetectors 82, 86 may be radiation emitters and radiation detectors of other suitable types that emit and detect corresponding radiation. Other suitable types of emitter/detector pairs may include ultrasonic emitters/detectors or electric field (c-field) emitters/detectors.

The photodetectors 82, 86 are configured and positioned to detect the tablets T as they pass through the dispensing channel 120. The photodetectors 82, 86 are configured to generate detector signals that are proportional to the light received thereby. The photoemitter 80 is positioned and configured to generate light that is directed toward the photodetector 82 across the dispensing pathway of the tablets T. Similarly, the photoemitter 84 is positioned and configured to generate light that is directed toward the photodetector 86 across the dispensing pathway of the tablets T. In this manner, when a tablet T interrupts the light transmitted from the photoemitter 80, 84 to the photodetector 82, 86, the detector signal will change based on the reduced light being received at the respective photodetector 82, 86.

The photoemitters 80, 84 and the photodetectors 82, 86 are operably connected to associated sensor receiver/processor electronics. The photoemitter 80 and the photodetector 82 may be electrically connected to an associated controller by respective lead wires 83 (FIG. 6; lead wires for the photoemitters 80, 84 not shown). According to some embodiments, the associated controller is or includes the controller 42, any intervening circuits, and/or a circuit board mounted on and/or dedicated to the bin 100.

According to some embodiments, the controller 42 uses detection signals from one or both of the photodetectors 82, 86 to count the dispensed tablets, to assess a tablet or tablets, and/or to determine conditions or performance in tablet dispensing. In some cases, the sensor system 102 operates the valves 142, 146 or other devices in response to identified or determined count, conditions or performance in dispensing.

Exemplary operation of the dispensing system 40 will now be described. The bin 100 is filled with tablets T to be dispensed. The tablets T may initially be at rest. At this time, the valves 142, 144 are closed so that no gas flow is provided through the jet outlets 146, 148 or the agitation outlets 152, 154.

If necessary, the adjustable dispensing channel subassembly 170 is suitably adjusted using the adjusters 180, 182 to provide the dispensing channel 120 and/or the inlet 122 with the appropriate dimensions for singulating the intended tablets T.

Figure 7:
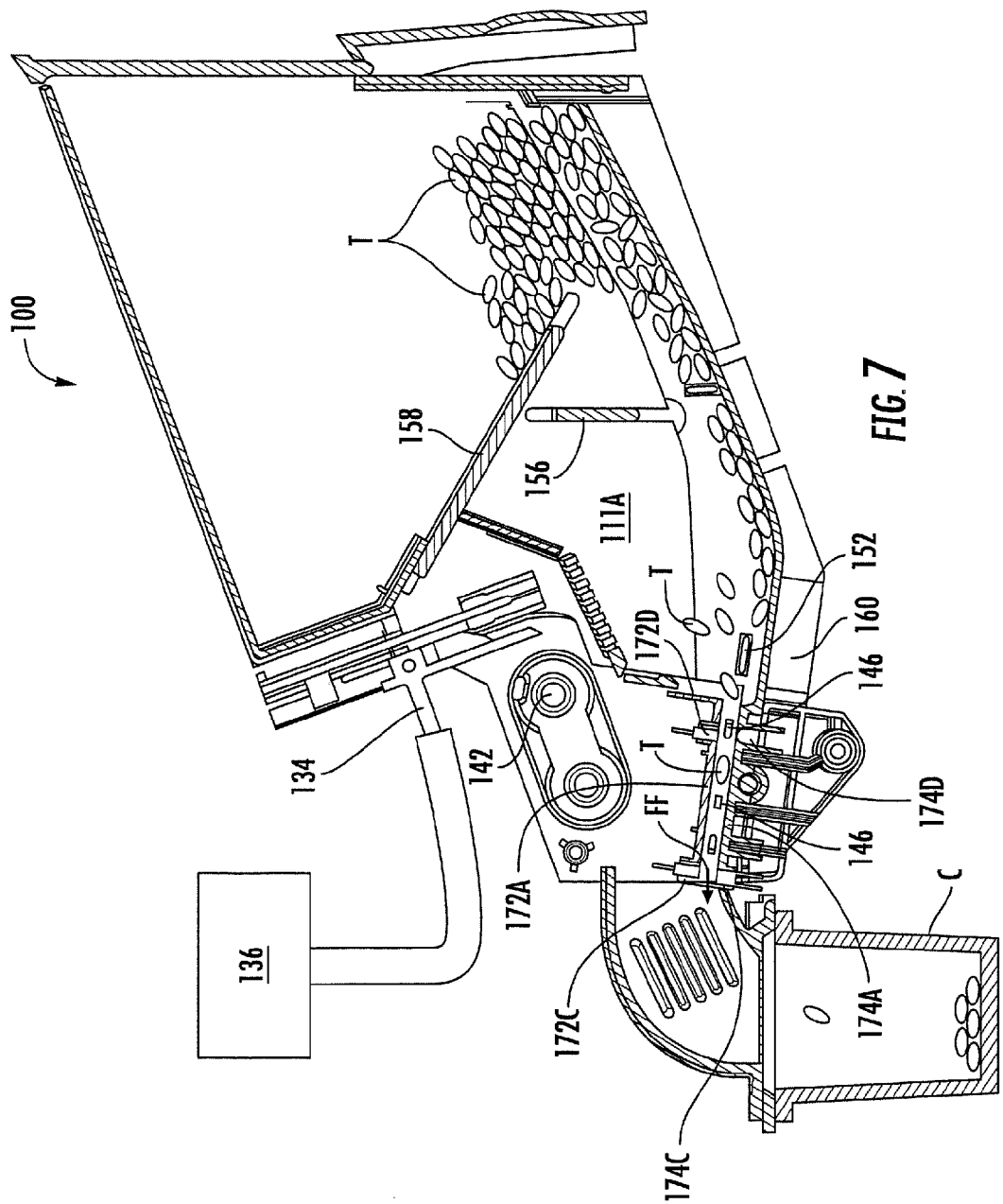
FIG. 7 is a cross-sectional view of the bin of FIG. 4 wherein tablets contained therein are being agitated and dispensed in a forward or dispensing direction.

When is it desired to dispense the tablets T to fill the container C, the dispensing carrier 70, directed by the controller 42, moves the container C to the exit port of the nozzle 114 of the selected dispensing bin 100. The controller 42 signals the forward valve 142 to open (while the reverse valve 144 remains closed). The opened valve 142 permits the pressurized gas from the gas source 136 to flow through the gas supply passages and out through the forward drive jet outlets 146. The pressurized flow from the jet outlets 146 creates high velocity gas jets that generate suction that causes a forward flow FF of high pressure, high velocity air to be drawn outwardly through the dispensing channel 120 (FIG. 7). Tablets T are oriented into a preferred orientation by the shape of the inlet 122 to the dispensing channel 120 and dispensed into the container C through the dispensing channel 120 and the outlet 124 under the force of the forward flow FF. The photodetectors 82, 86 detect the tablets T as they pass through respective predetermined points in the dispensing channel 120.

The opening of the valve 142 also simultaneously permits the pressurized supply gas from the gas source 136 to flow through the front air amplifier 160 and out through the front agitation outlet 152 as an agitation air flow having a relatively low velocity and high mass flow rate as compared to the gas flow from the jet outlets 146. The front agitation air flow flows through and lofts or otherwise displaces (i.e., agitates) the tablets T in the front subchamber 111A proximate the inlet 122. This agitation of the tablets T helps to orient the tablets T for singulated entry into the dispensing channel 120 and to prevent tablet jams. According to some embodiments, the forward jet gas flows and the front agitation flow are provided simultaneously.

Figure 8:
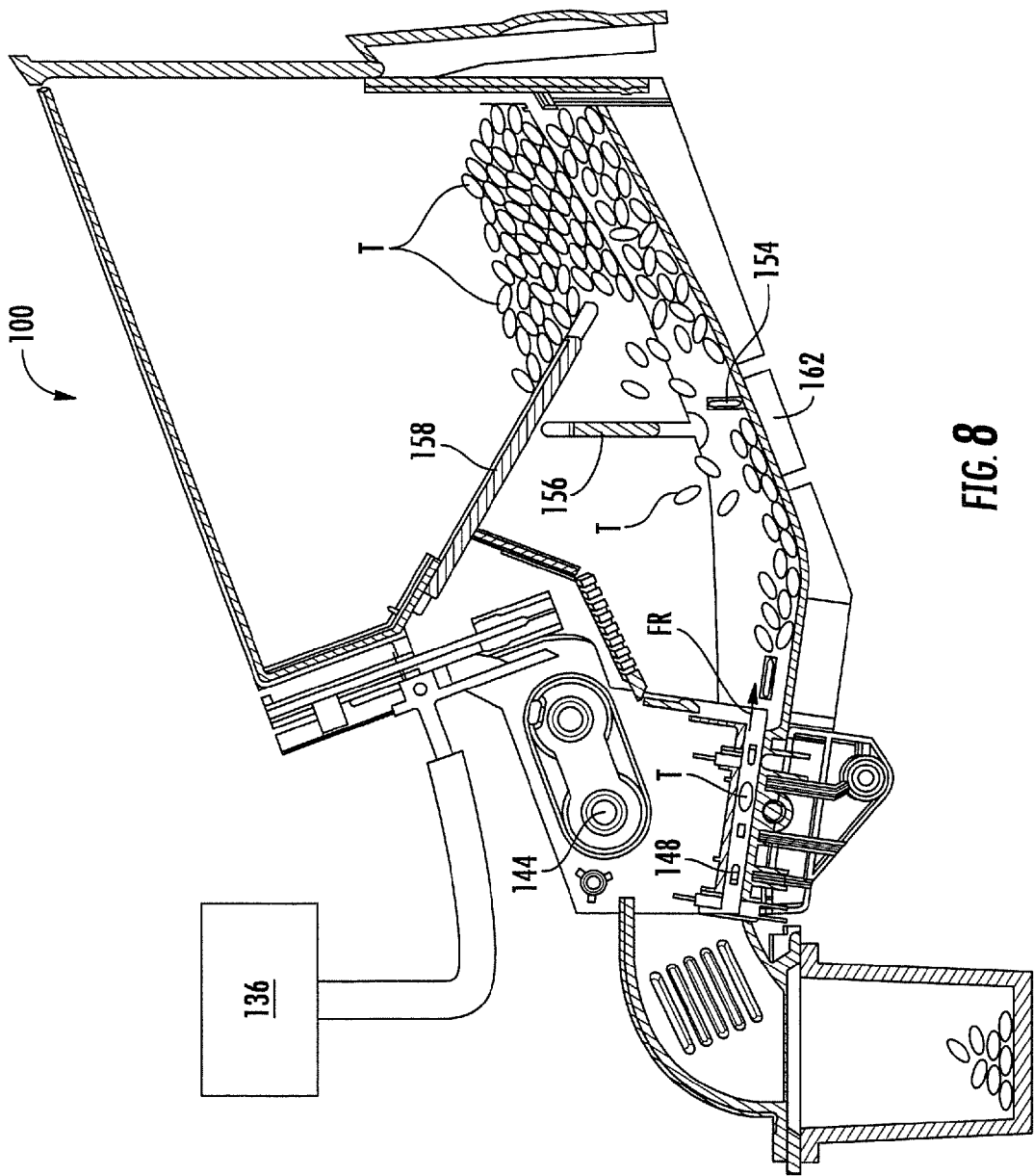
FIG. 8 is a cross-sectional view of the bin of FIG. 4 wherein a tablet is being returned to a hopper of the bin in a reverse direction.
Figure 9:
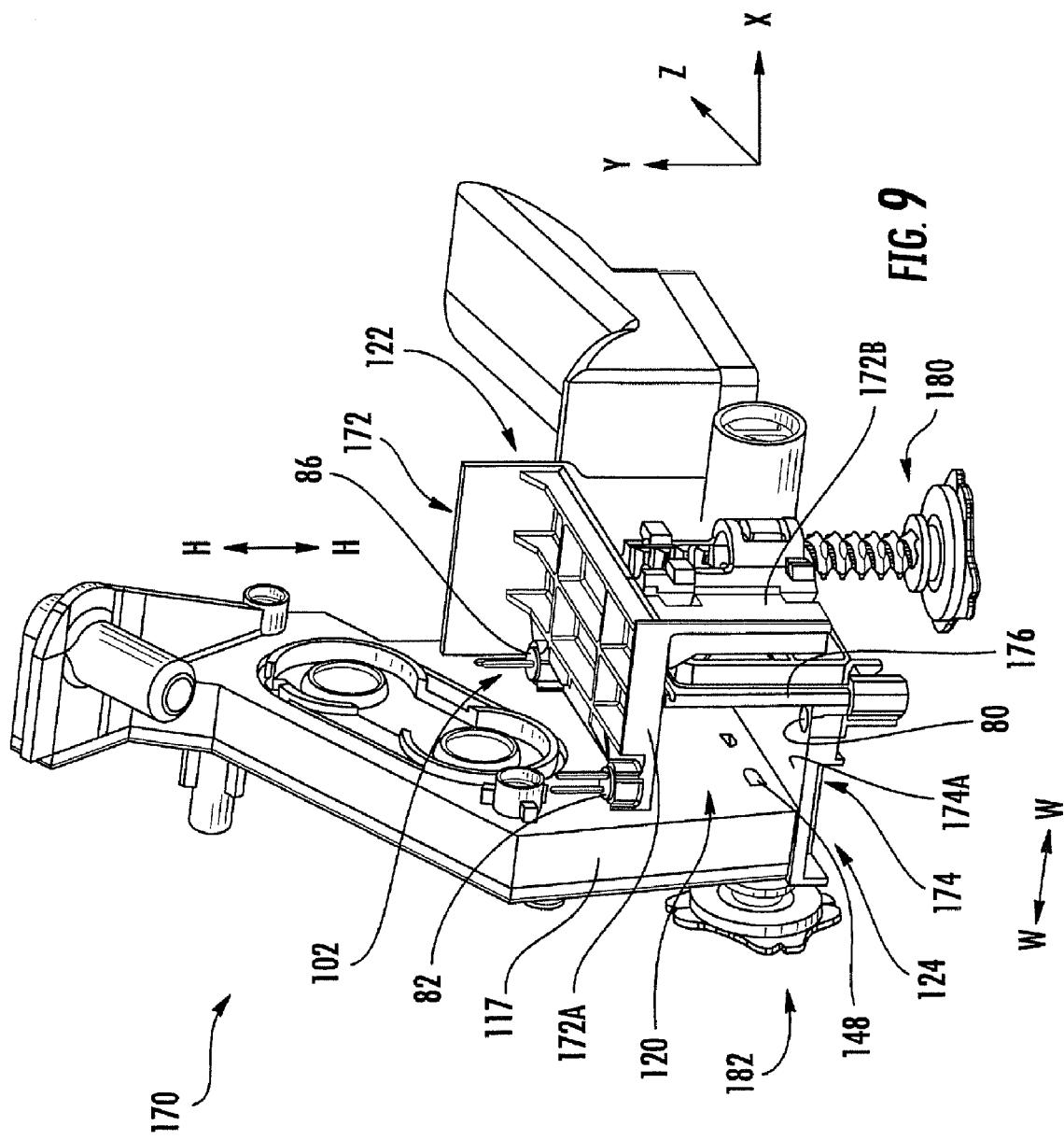
FIG. 9 is a front, right perspective view of an adjustable dispensing channel subassembly forming a part of the bin of FIG. 4.

Once dispensing is complete (i.e., a predetermined number of tablets has been dispensed and counted), the controller 42 activates the forward valve 142 to close and the reverse valve 144 to open. The opened valve 144 permits the pressurized gas from the gas source 136 to flow out through the reverse drive jet outlet 148. The pressurized flow from the jet outlet 148 creates a high velocity gas jet that generates suction that causes a reverse (i.e., rearward) flow FR of high pressure air to be drawn inwardly through the dispensing channel 120 toward the chamber 111. In this manner, the airflow is reversed and any tablets T remaining in the channel 120 are returned to the chamber 111 under the force of the reverse flow (FIG. 8).

The opening of the valve 144 also simultaneously permits the pressurized supply gas from the gas source 136 to flow through the rear air amplifier 160 and out through the rear agitation outlet 154 as a rear agitation air flow which has a relatively low velocity and high mass flow rate as compared to the gas flow from the jet outlet 148. The rear agitation air flow flows through and lofts or otherwise displaces (i.e., agitates) the tablets T in the front subchamber 111A and/or the intermediate subchamber 111B proximate the choke point between the partition wall 156 and the floor 150. This agitation of the tablets T helps to loosen the tablets T to permit return of the tablets T and to prevent or break tablet jams. According to some embodiments, the reverse jet gas flow and the rear agitation flow are provided simultaneously. According to some embodiments, the reverse valve 144 is opened and then closed after a relatively short period to provide the reverse flow FR and the rear agitation flow as short bursts.

During a dispensing cycle (i.e., when the forward flow FF is being generated), the controller 42 may determine that a tablet jam condition is or may be present. A tablet jam is a condition wherein one or more tablets are caught up in the bin 100 such that tablets T will not feed into or through the dispensing channel 120 under the pass of the forward flow FF. Tablets may form a jam at the nozzle inlet 122, one of the choke points or elsewhere so that no tablets are sensed passing through the dispensing passage 120 for a prescribed period of time while the forward air flow FF is being generated. When a tablet jam is identified by the controller 42, the controller 42 will issue a "jam clear" or "backjet" by closing the forward valve 142 and opening the reverse valve 144 as described above for generating the air flow FR and the rear agitation flow to clear a perceived tablet jam. These air flows may serve to dislodge any such jams as well as to loosen the tablets in the subchamber 111C.

While, in the foregoing description, the controller 42 controls the valves 142, 146, the valves 142, 146 may alternatively be controlled by a local controller unique to each bin 100.

Typically, an operator will request that a desired number of tablets be dispensed ("the requested count"). The sensor system 102 detects the tablets T as they pass through predetermined points in the dispensing channel 120, as discussed in more detail below. The controller 42 uses the detection signals from the photodetector 82 and/or the photodetector 86 to monitor and maintain a registered count of the tablets T dispensed ("the system count"). When the system count matches the requested count, the controller 42 will deem the dispensing complete and cease dispensing of the tablets T. If the controller miscounts the tablets actually dispensed, there will be a mismatch between the system count and the final actual count (and, therefore, the requested count).

In use, the operator may adjust or readjust the dimensions of the dispensing channel 120 by moving one or both of the walls 172A, 176 relative to one another using the adjustment mechanisms 180, 182. Typically, the operator will make such an adjustment as part of the initial setup procedure when installing the bin 100 in the dispensing system 40. The adjustable dispensing channel subassembly 170 permits the dispensing channel 120 to be sized and shaped to complement tablets T of different dimensions within a range of dimensions. Thus, it is not necessary to preconfigure the bin 100 for a specific tablet size; rather, the bin 100 can be reconfigured by the operator to fit the intended tablet size.

In some cases, the operator may only adjust the dispensing channel subassembly 170 once, namely, from its factory settings to the settings appropriate for the tablets being dispensed from the bin. For example, only one adjustment may ever be needed where the bin 100 is indefinitely or permanently dedicated to dispensing a particular tablet size and/or shape.

In some cases, the operator may make such adjustments to the channel 120 between dispensing sessions in order to size the cross-section of the dispensing channel 120 to complement the size and configuration of the tablets to be dispensed next.

However, by readjusting the walls 172A, 176 (whether during initial setup or between counting sessions), the operator also alters the geometry between the photoemitters 80, 84 and their respective photodetectors 82, 86 and thereby their cooperative photoelectric performance and detection characteristics. For example, raising and lowering the ceiling wall 172A increases and decreases, respectively, the distance between the photoemitter 80 and the photodetector 82 and between the photoemitter 84 and the photodetector 86 parallel to the Y-axis. Moving the wall 176 left and right also moves the floor wall 174A left and right and thereby changes the distance of offset between the photoemitter 80 and the photodetector 82 and between the photoemitter 84 and the photodetector 86 along or parallel to the X-axis. Without compensation, these positional variations may change the degree of overlap between the emission field of the photoemitter 80 and the reception field of the photodetector 82 (and, likewise, the degree of overlap between the emission field of the photoemitter 84 and the reception field of the photodetector 86), thereby creating corresponding variations in the sensitivity of the sensor system 102. For clarity, the construction and operation of the system 40 will be described with regard to the photoemitter 80 and the photodetector 82. It will be appreciated that, according to some embodiments, this description likewise applies to the photoemitter 84 and the photodetector 86.

Figure 10:
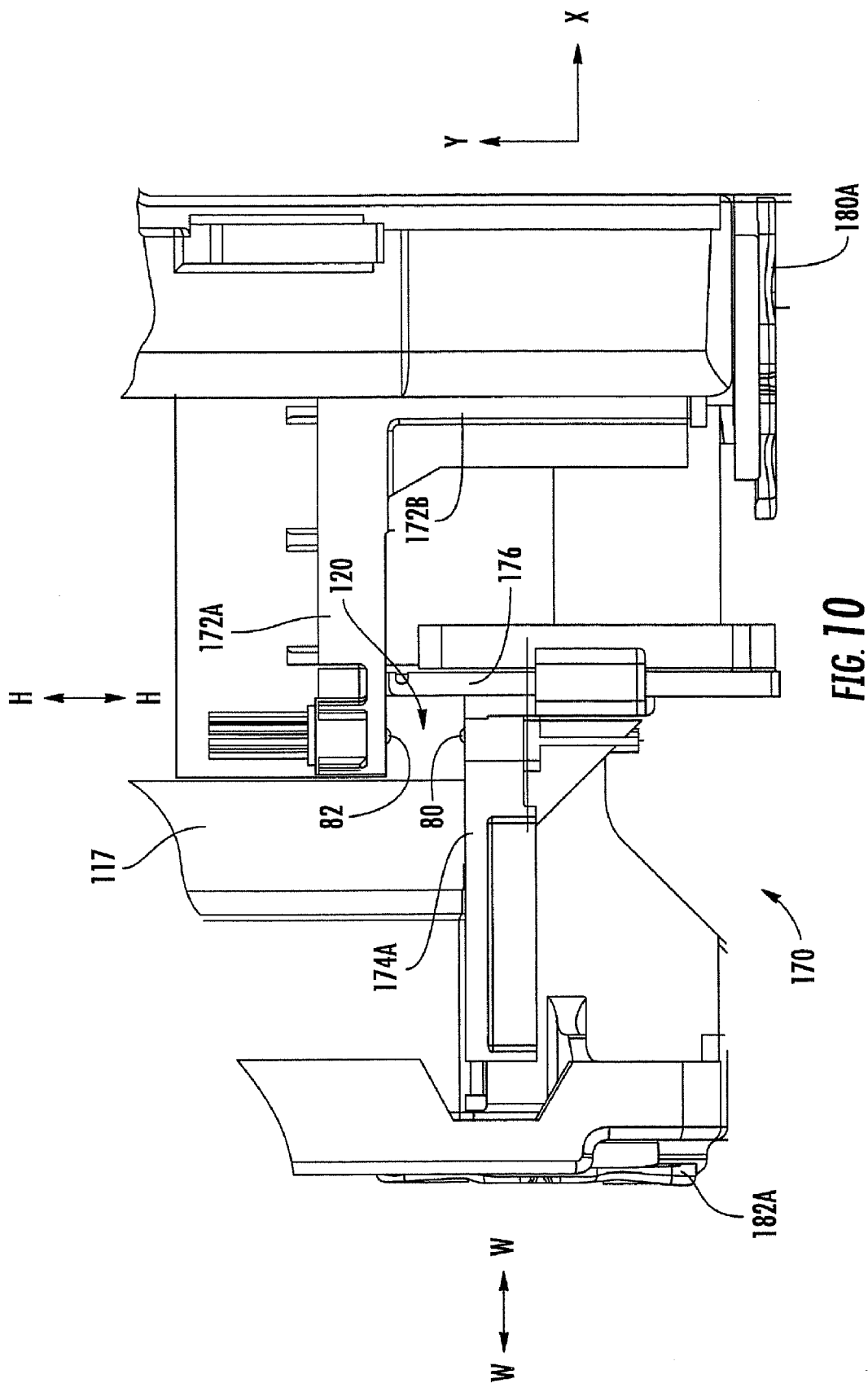
FIG. 10 is an enlarged, fragmentary, front end view of the bin of FIG. 4 with a nozzle thereof removed, wherein the dispensing channel subassembly thereof is positioned in a first position.
Figure 13:
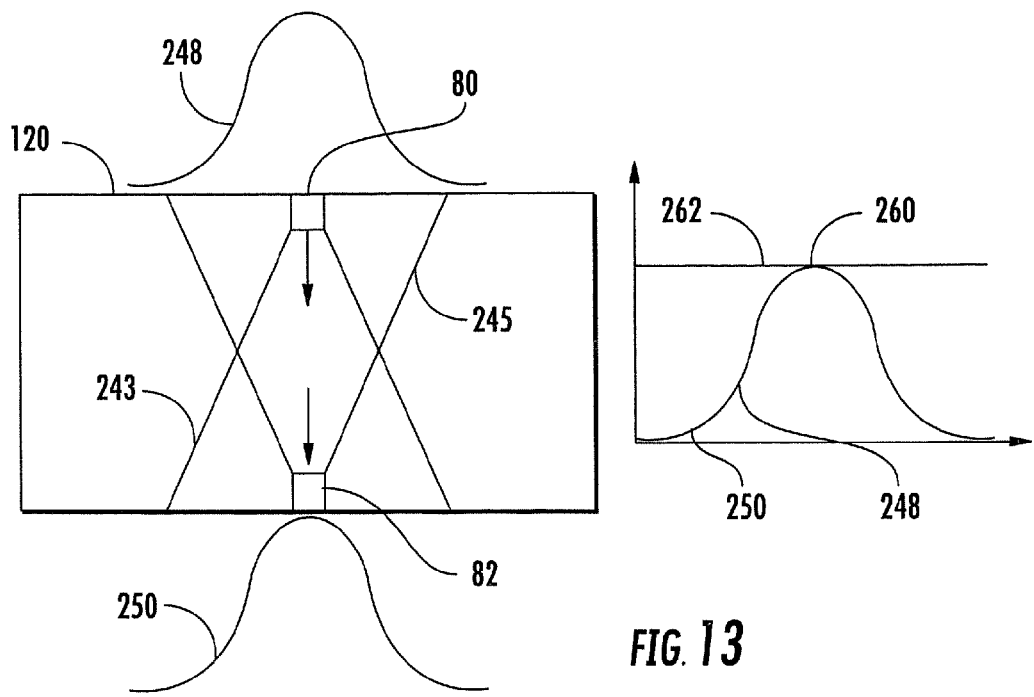
FIGS. 13 and 14 are diagrams and corresponding photometric plots illustrating an effect of a relative position between a photoemitter and a photodetector according to some embodiments of the present invention.
Figure 14:
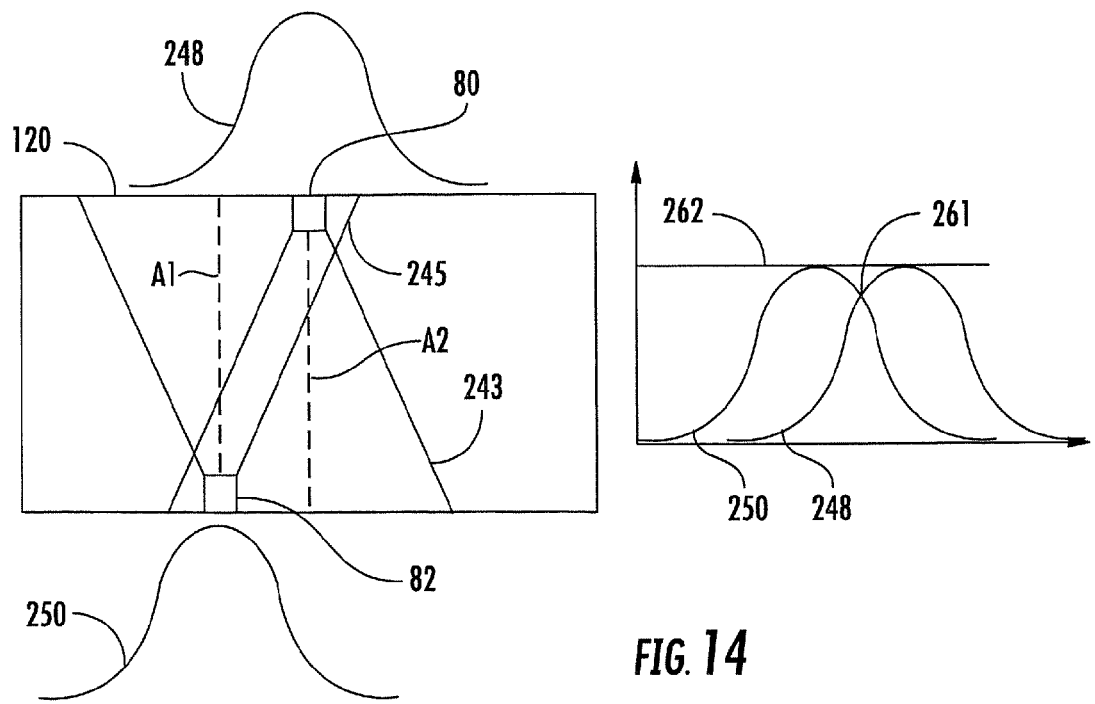

The foregoing effect will now be illustrated with reference to FIGS. 10 and 11, which are front end views (with the nozzle 14 removed) of the adjustable dispensing channel subassembly 170 in two different positions to provide respective configurations of the dispensing channel 120 having different dimensions. FIGS. 13 and 14 are diagrams of photometric plots corresponding to the positions of FIGS. 10 and 11, respectively, and illustrating an effect of a relative position (and variation therein) between the photoemitter 80 and the photodetector 82 along the X-axis. FIGS. 10 and 13 illustrate the dispensing channel 120 configured such that the photoemitter 80 is substantially aligned with the photodetector 82 along an axis parallel to the Y-axis (i.e., located at substantially the same position along the X-axis). In contrast, FIGS. 11 and 14 illustrate a dispensing channel configuration wherein the photoemitter 80 and the photodetector 82 are offset or skewed from one another along the X-axis.

As illustrated in FIG. 13, the photoemitter 80 emits light to provide an emission field that may be characterized by an emission cone 243. The intensity of light transmitted by the photoemitter 80 in the emission field may have less than uniform emission characteristics (i.e., intensity) throughout the range of the emission cone 243. For example, the emission cone 243 may have emission characteristics that correspond to an emission curve 248 as shown in FIG. 13. In the illustrative emission curve 248, the intensity of the emitted light diminishes as the angle within the emission cone 243 increases.

Similarly, the photodetector 82 defines a reception field (which may be characterized as a reception cone 245) from which it can operably receive ambient light. The reception cone 245 has a reception curve 250 similar to that of the emission curve 248. In the illustrated embodiment, the peaks of the emission curve 248 and the reception curve 250 occur near the centers of the emission cone 243 and the reception cone 245, respectively. In such embodiments, peak reception of emitted light may occur when the photoemitter 80 is substantially across from and directed toward the photodetector 82. A peak reception value 260 of emitted light may be estimated by superimposing the emission curve 248 and the reception curve 250 at their relative positions and determining an intersection of the emission curve 248 and the reception curve 250. Because, in this simplified example, the emission curve 248 and the reception curve 250 are substantially similar and the photoemitter 80 is directly across from the photodetector 82, the peak reception value 260 coincides with the maximum values 262 of the emission curve 248 and the reception curve 250. As illustrated, the emission cone 243, the reception cone 245, the emission curve 248, and the reception curve 250 are simplified representations and are presented merely by way of example.

Figure 11:
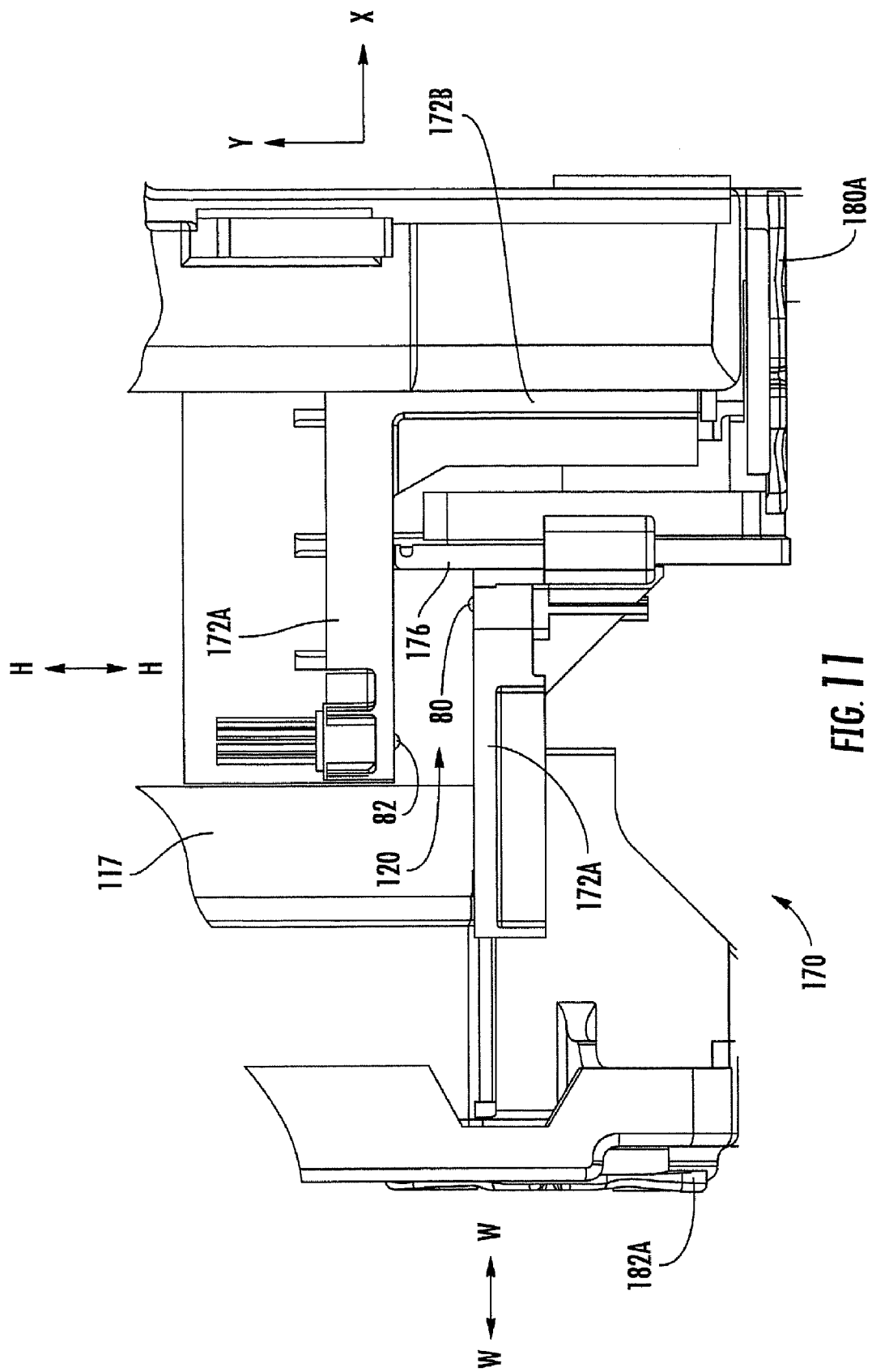
FIG. 11 is an enlarged, fragmentary, front end view of the bin of FIG. 4 with the nozzle thereof removed, wherein the dispensing channel subassembly thereof is positioned in a second position.

When the photodetector 82 and the photoemitter 80 are in their relatively skewed or offset position as shown in FIG. 11, the emission curve 248 and the reception curve 250 are superimposed on one another in their relative positions as represented in FIG. 14. The point of intersection between the emission curve 248 and the reception curve 250 represents a new peak reception value 261, which may represent the best available received light at the photodetector 82 at the offset positions. Note that the peak reception value 261 is substantially less than the maximum values 262 based on the offset between the photoemitter 80 and the photodetector 82.

Figure 12:
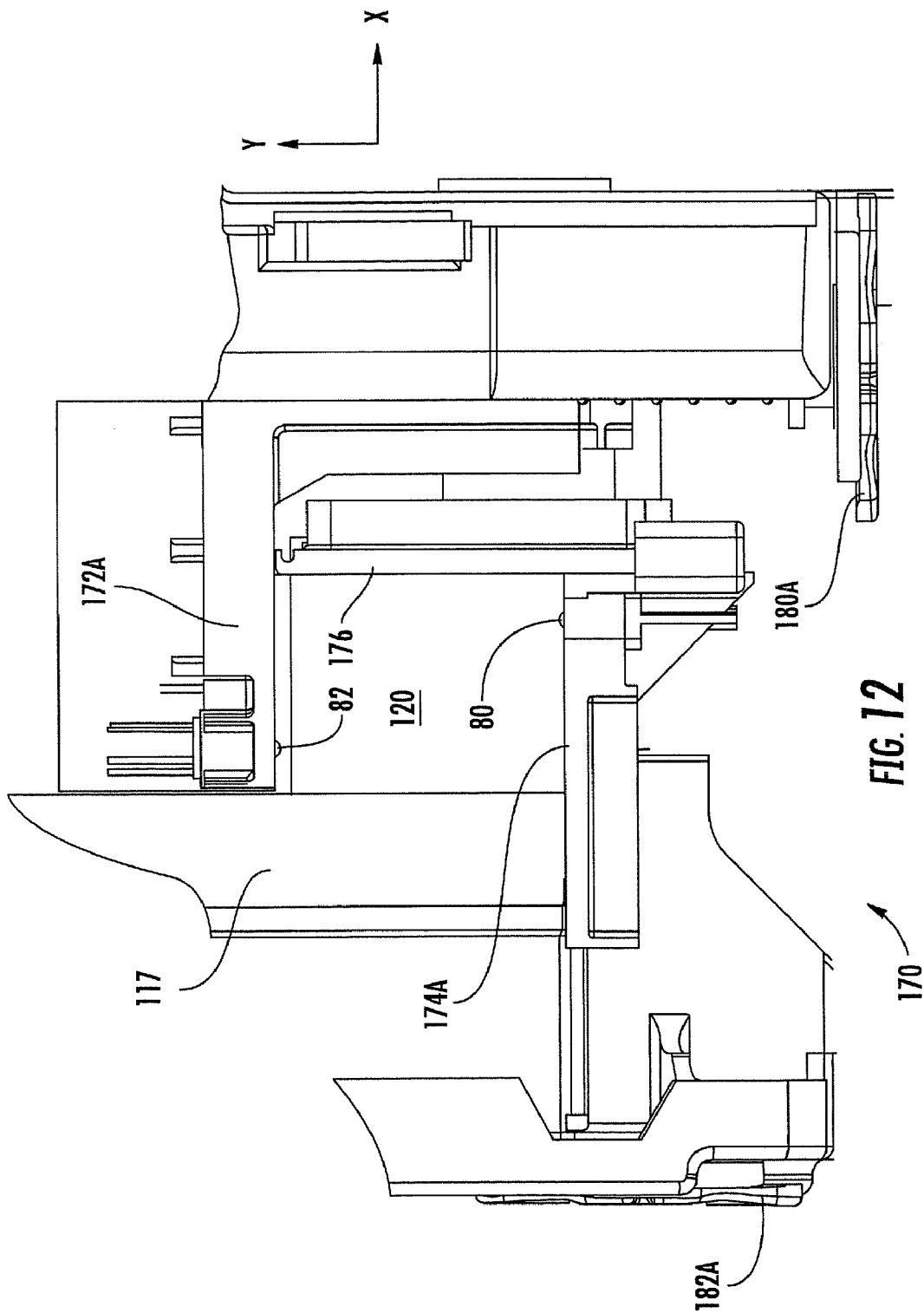
FIG. 12 is an enlarged, fragmentary, front end view of the bin of FIG. 4 with the nozzle thereof removed, wherein the dispensing channel subassembly thereof is positioned in a third position.

The peak reception value may also be affected by or vary with the distance between the photoemitter 80 and the photodetector 82. For example, the dispensing channel subassembly 170 may be further adjusted to move the ceiling wall 172A away from the floor wall 174A to assume the geometry between the photoemitter 80 and the photodetector 82 as shown in FIG. 12. It will be appreciated that various other combinations of width and height may be selected for the dispensing channel 120, with corresponding different geometries between the photoemitter 80 and the photodetector 82. The spacing between the photoemitter 80 and the photodetector 82 may affect both the amount of light dispersal and the amount of overlap between the offset photoemitter and photodetector.

In accordance with some embodiments of the present invention, in order to facilitate improved detection of the tablets T, the sensor system 102 accommodates or compensates for the reduced peak reception value 261 by increasing the output of the photoemitter 80. According to some embodiments, the offset positions between the photoemitter 80 and the photodetector 82 are compensated for by adjusting (i.e., increasing or decreasing) the energy supply to the photoemitter 80 to generate a detector reference signal level from the photodetector 82 that is within a prescribed reference level range. This may be accomplished by a calibration or recalibration step or process that returns the photodetector reference signal to a level within the reference level range (or maintains the detector reference signal if already in the reference level range). According to some embodiments, the calibration is automatically initiated and executed by the controller 42. However, the calibration step may additionally or alternatively be initiated manually.

Figure 15:
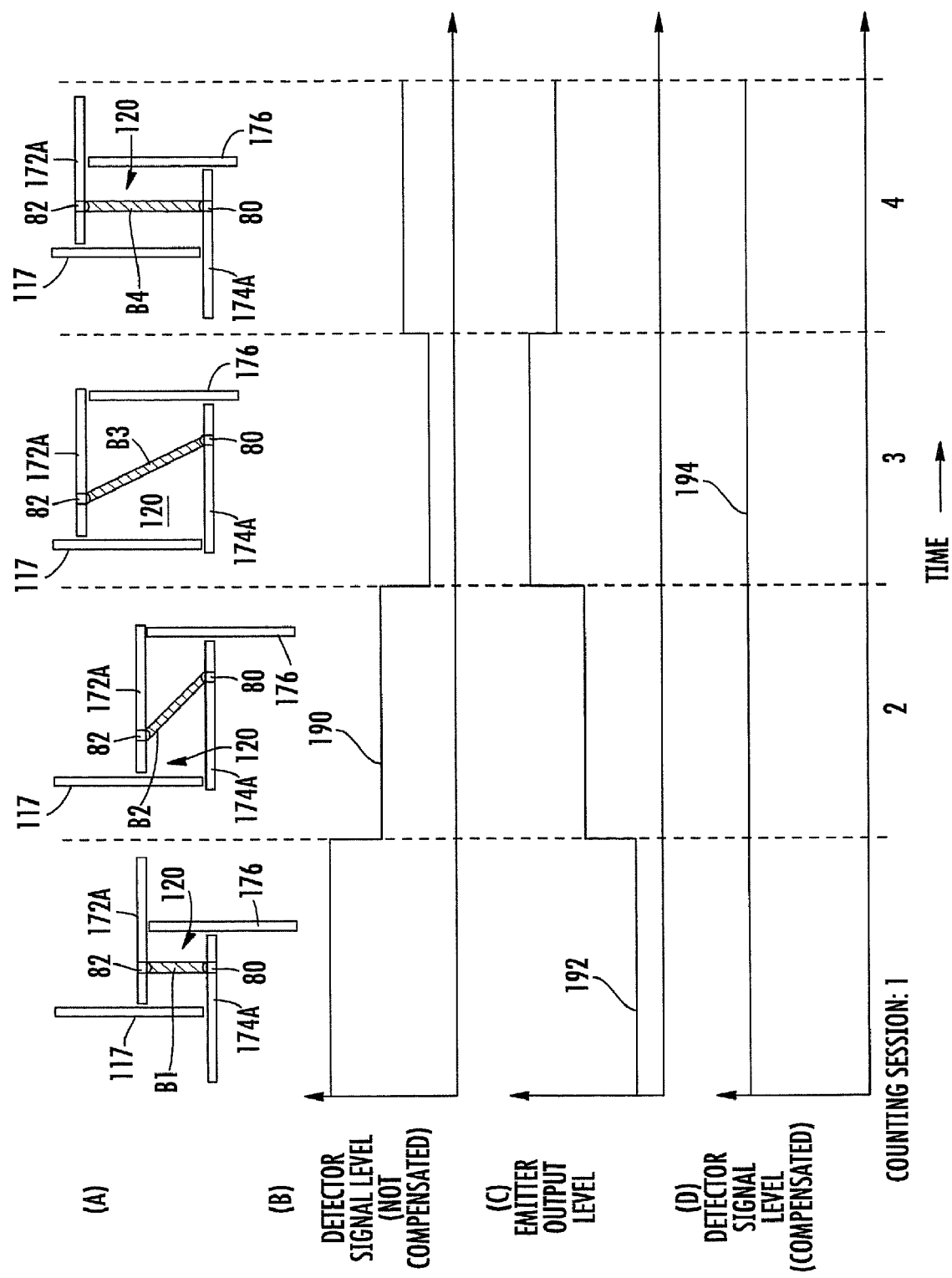
FIG. 15 is a graph illustrating plots of photodetector signals and photoemitter outputs during multiple counting sessions according to some embodiments of the present invention.

With reference to FIG. 15, aspects of exemplary Counting Sessions 1-4 are schematically illustrated therein. For the purpose of illustration, the Counting Sessions 1-4 will be described as an exemplary series of counting sessions wherein the dispensing channel subassembly 170 is set to different respective configurations. However, as discussed herein, in some cases the subassembly 170 may be set once and the bin 100 used with the subassembly 170 at that setting for multiple, all or an indefinite number of counting sessions. Thus, while a series of counting sessions are shown with transitions or adjustments in detector signals or emitter outputs therebetween, it should be appreciated that, in some uses and some embodiments, the bin 100 may, for example, be set to only one of the dispensing channel configurations so that the corresponding Counting Sessions 1-4 represent the performance or attributes of the sensor system 102 in that setting and the other illustrated Counting Sessions 1-4 do not apply (although they may represent the performance or attributes of the sensor system 102 if the subassembly 170 had alternatively been set in such other configurations).

In section (A) of FIG. 15, an end view of the configuration of the walls 172A, 174A (and, therefore, the relative positions of the photoemitter 80 and the photodetector 82) are shown for each counting session. Section (B) of FIG. 15 is a graph showing the reference signal 190 (e.g., the signal in the absence of any occluding tablet T) generated by the photodetector 82 without compensation in accordance with the present invention (i.e., the light output of the photoemitter 80 is the same during all of the counting sessions). Section (C) of FIG. 15 is a graph representing the light output level 192 from the photoemitter 80 during each counting session and with compensation or recalibration in accordance with embodiments of the present invention. As discussed herein, the photoemitter light output may be proportional to a photoemitter energy level supplied to the photoemitter 80 by an emitter driver. Section (D) of FIG. 15 is a graph representing the reference signal 194 generated by the photodetector 82 during each counting session with compensation provided in accordance with embodiments of the present invention (i.e., with the adjustments to the photoemitter light output as shown in Section (C)).

With reference to Section (A) and Section (B) of FIG. 15, the detector signal 190 of the photodetector 82 without variation of the photoemitter output will first be described. In Counting Session 1, the photodetector 82 and the photoemitter 80 are in Y-axis alignment and relatively close proximity and the detector signal is therefore relatively high. In Counting Session 2, the photodetector 82 and the photoemitter 80 are offset, causing the detector signal to drop. In Counting Session 3, the photodetector 82 and the photoemitter 80 remain offset and are also further separated, causing the detector signal to drop further. In Counting Session 4, the photodetector 82 and the photoemitter 80 are returned to alignment but remain separated, causing the detector signal to be partially restored. In practice, the variation in sensitivity as illustrated may present the problems described hereinabove.

Referring now to Section (A), Section (C) and Section (D) of FIG. 15, it will be appreciated that a consistent reference signal 194 can be provided from the photodetector from counting session to counting session even though the geometry between the photodetector 82 and the photoemitter 80 is changed between counting sessions. In Counting Session 1, the photoemitter 80 is set to a first output level to provide the desired detector signal level 190 from the photodetector 82. When the photodetector 82 and photoemitter 80 are moved out of alignment for Counting Session 2, the output of the photoemitter 80 is increased to compensate and maintain the reference detector signal from the photodetector 82 at the same desired level. The output of the photoemitter 80 is likewise increased and then lowered to compensate for the reconfigurations of the photodetector 82 and the photoemitter 80 in Counting Sessions 3 and 4, respectively, to maintain the reference detector signal from the photodetector 82 at the desired level. While the recalibrations of the photoemitter 80 are illustrated in Section (C) as substantially instantaneous, it will be appreciated that some period of transition may occur.

While the exemplary dispensing channel configurations and sensor system performance of FIG. 15 are discussed with regard to sequential counting sessions, the foregoing discussion likewise generally applies in the case where the dispensing channel 120 is adjusted once (e.g. when the bin is initially installed) and remains in its initial configuration throughout and between some or all subsequent counting sessions. For example, if the dispensing channel 120 is set to the configuration of Counting Session 1, 2, 3 or 4, the output level of the photoemitter 80 is set to the corresponding respective level indicated in Section (C) so that, regardless of the dispensing channel configuration setting selected, substantially the same detector signal level as illustrated in Section (D) will be provided. For example, the dispensing channel configuration of Counting Session 1 may be an initial factory or optimized setting and the configurations of Counting Sessions 2, 3 and 4 may be different alternative configurations the operator may select as the indefinite or permanent configuration of the dispensing channel 120. In each case, the emitter output level is adjusted to compensate for the relative positions of the photoemitter 80 and the photodetector 82 as indicated in Section (C).

According to some embodiments, the calibration step is executed only before and/or between counting sessions and not during counting sessions. In this manner, the system 40 can compensate for differences or changes in the relative positions of the photoemitter 80 and the photodetector 82 while preventing or reducing the introduction of undesirable variation in the sensor system parameters. By recalibrating to restore the reference signal level to a value within the prescribed reference level range between counting sessions, additional resolution based on the stability of the reference signal level may be achieved. The additional resolution may facilitate discrimination between multiple different system and/or tablet characteristics. For example, tablet profiles and/or signatures may be determined and used to detect tablet fragments and/or incorrectly selected tablets. Additionally, embodiments providing digital detector signals may facilitate additional event analysis advantages through the use of digital processing techniques.

Figure 16:
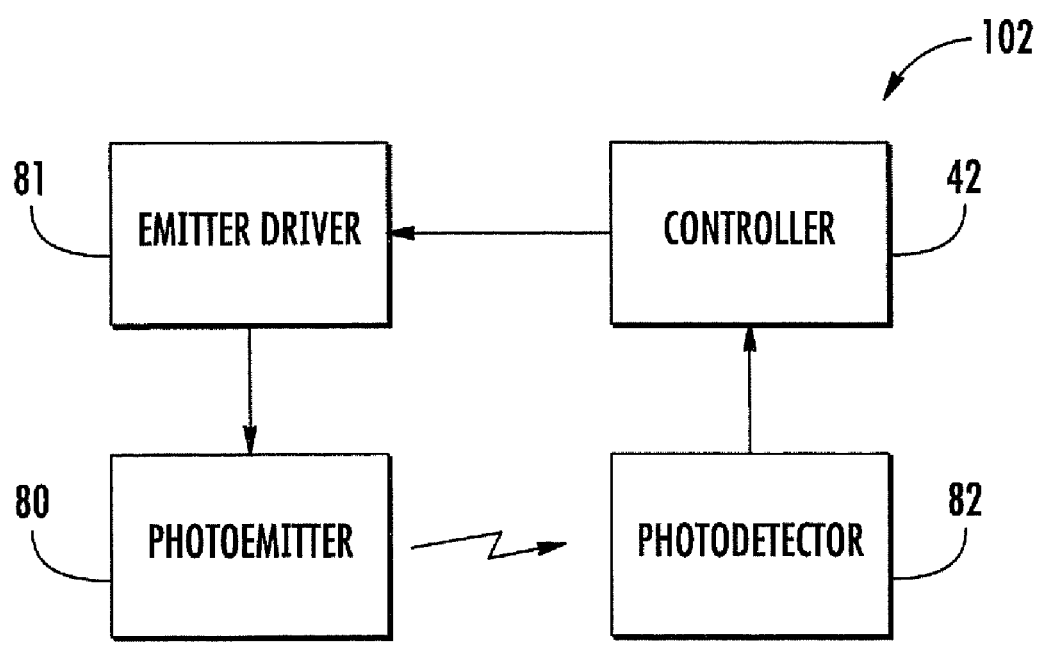
FIG. 16 is a block diagram illustrating a sensor system in a pharmaceutical tablet dispensing system according to some embodiments of the present invention.

FIG. 16 is a block diagram schematically illustrating portions of the sensor system 102 in accordance with some embodiments of the present invention. The sensor system 102 includes an emitter driver 81 configured to provide current to the photoemitter 80. The intensity of light emitted by the photoemitter 80 is variable based on the amount of current and/or energy level provided by the emitter driver 81. A portion of the light emitted by the photoemitter 80 is received by the photodetector 82, which generates a detector signal proportional to the amount of light received. The detector signal is received by the controller 42, which is configured to process the detector signal to determine the occurrence of an event, such as a tablet T traversing the dispensing pathway. The controller 42 may also be configured to provide control signals to the emitter driver 81. In some embodiments, emitter driver 81 and the controller 42 may be employed in an integrated hardware device. Some embodiments employ an analog to digital converter (A/D) to convert the detector signals into digital detector signals. Although the analog to digital converter may be a separate component, in some embodiments, it is integrated into the photodetector 82 and/or the controller 42.

As discussed above, operations also may include monitoring the detector signals from the photodetector 82 to determine a reference signal level. The reference signal level may correspond to the amount of light received at the photodetector 82 in the absence of an article blocking light between the photoemitter 80 and the photodetector 82.

Event signals may be identified from the photodetector 82 with respect to a threshold signal level. For example, where the detector signal value changes from the reference signal level to some level below the threshold signal level, an event signal may be identified. In some embodiments, the event signals are digitally processed to detect, count and/or characterize the articles passed along the dispensing pathway. The event signals may be evaluated in terms of signal value and/or signal duration to detect, count and/or characterize the articles.

Mounting the photoemitter 80, 84 and photodetector 82, 86 of each sensor pair for relative movement with adjustment of the adjustable dispensing channel subassembly 170 may provide significant performance advantages as compared to dispensing devices wherein the dispensing channel is adjustable but the photoemitter and the photodetector are fixed relative to one another and walls defining the dispensing channel. In the latter case, the dispensing channel may be re-configured such that the effective sensing area of the sensing pair (i.e., the overlap between the emission cone of the photoemitter 80 and the reception cone of the photodetector 82) is off center or otherwise skewed such that a "blind spot" is created in the dispensing channel. Tablets or fragments thereof may undesirably slip through the blind spot and thereby be dispensed but remain undetected.

Embodiments of the present invention may reduce or eliminate the foregoing risk by offsetting the photodetector 82 from the photoemitter 80. In this way, the effective field of view or sensing area of the sensor pair 80, 82 may be extended transversely to the dispensing path axis (i.e., the longitudinal axis Z (FIG. 9) of the dispensing channel 120) across both the width and height of the dispensing channel 120. In this way, the sensing area is increased in size and is distributed across the dispensing channel 120 in a manner that obviates sensing area blind spots or at least the creation of sensing area blind spots large enough to permit a tablet having a prescribed (or greater) size and shape to pass therethrough without occluding the sensor beam. According to some embodiments, the offset distance increases as the corresponding dimension of the dispensing channel 120 is increased by adjustment of the dispensing channel subassembly 170.

Figure 19:
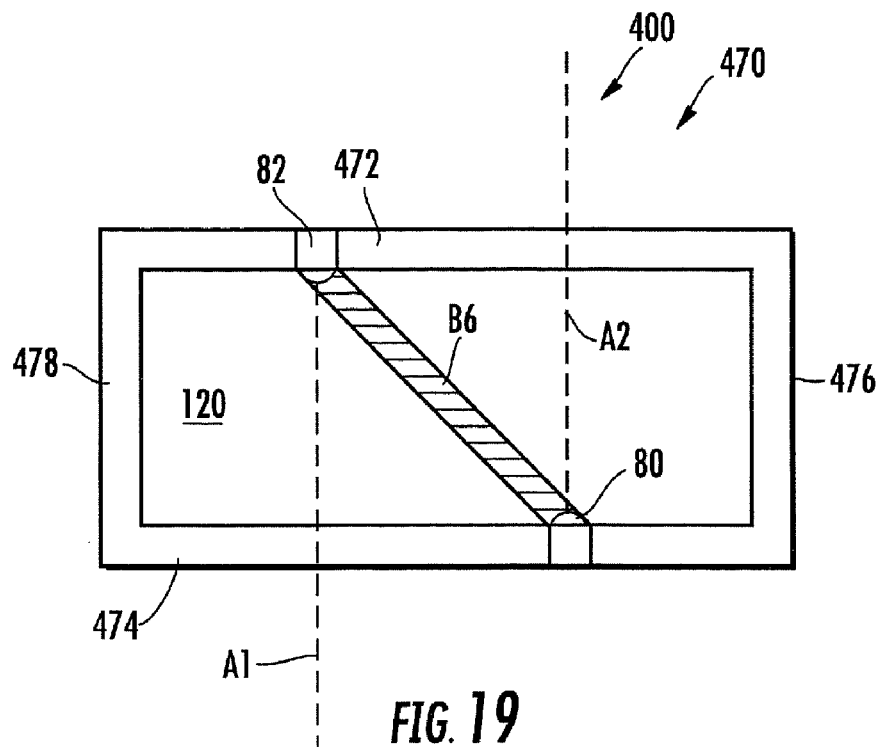
FIG. 19 is a partial, schematic front view of a bin according to further embodiments of the present invention.

By way of example, the effective sensing areas or beams B1, B2, B3 and B4 of the photoemitter 80 and the photodetector 82 are illustrated in FIG. 15, Section (A) for each dispensing channel configuration. FIG. 19 is an enlarged view of the configuration of Counting Session 2 with a tablet T illustrated passing between the photoemitter 80 and the photodetector 82. The photodetector 82 and the photoemitter 80 are positioned relatively adjacent diagonally opposed corners of the rectangle defined by the dispensing channel 120 in cross-section. The sensing beam B2 therefore extends diagonally across the dispensing channel 120 (i.e., at an angle with respect to each of the width dimension and the height dimension of the dispensing channel 120). As a result, the relative geometries of the sensing beam B2 and the dispensing channel 120 ensure that the tablet T will occlude the beam B2 and be detected.

Thus, the arrangement in accordance with embodiments of the present invention adjusts the configuration of the sensor/emitter pair in correspondence to the configuration of the dispensing channel 120 to prevent or reduce blind spots. The reduced blind spots or increased sensing area may also ensure that a given tablet occludes the beam B2 for a greater part of the length of the tablet, thereby providing for an improved tablet profile.

By contrast, if the photoemitter 80 and the photodetector 82 were fixed in relation to one another and the dispensing channel 120 such that, in the dispensing channel configuration of Counting Session 2, the photoemitter 80 were positioned directly below the photodetector 82 (i.e., on the primary sensing axis A1), the sensing beam would extend directly vertically and offset to the left of the center of the dispensing channel 120. An enlarged blind spot would thereby be created to the right of the sensor pair 80, 82. The enlarged blind spot would permit the illustrated tablet to pass the sensing beam on the right side of the dispensing channel 120 without occluding the sensing beam and being properly detected.

Figure 17:
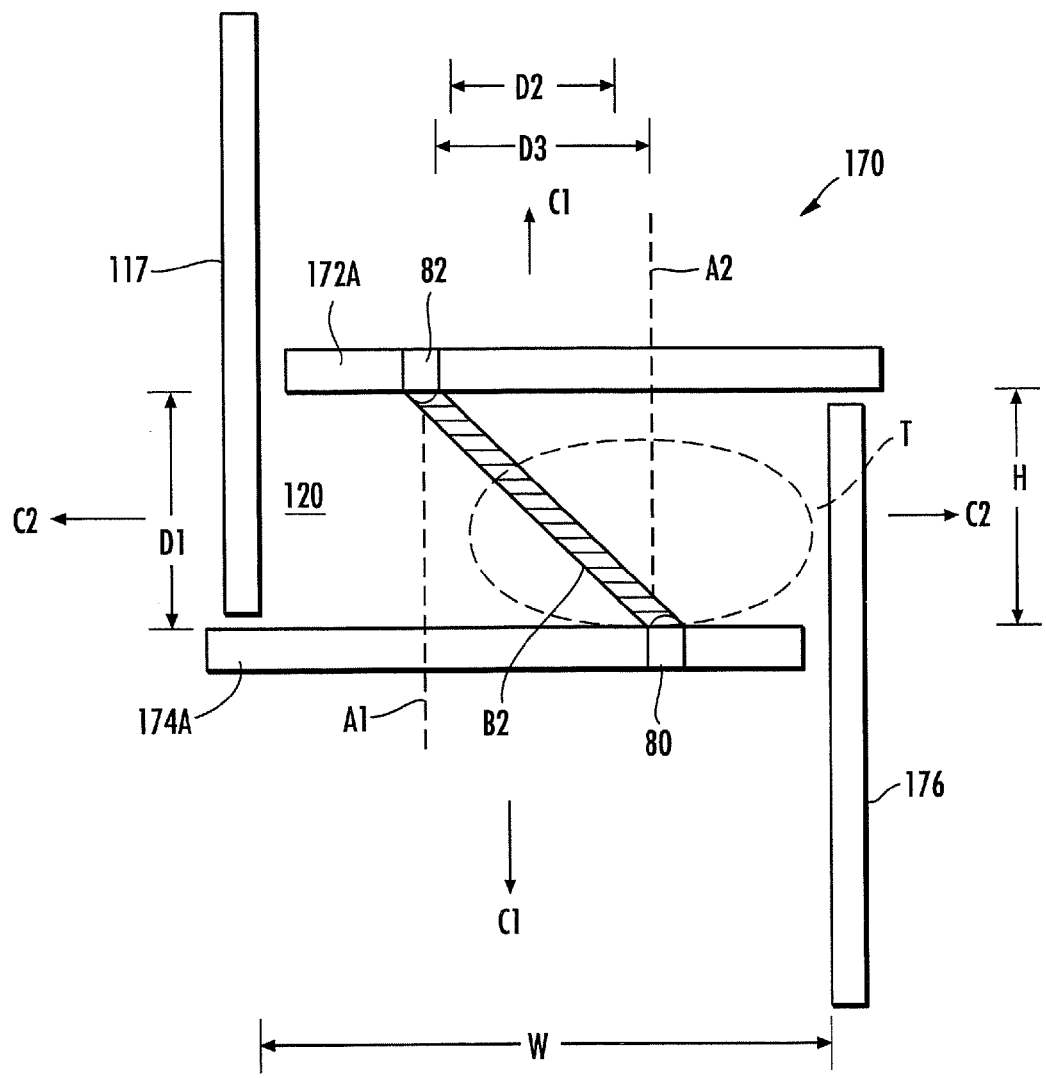
FIG. 17 is a schematic front view of the dispensing channel subassembly of the bin of FIG. 4 with a tablet in the dispensing channel thereof.

Referring to FIGS. 14 and 17, the photodetector 82 has a primary reception axis A1 defined as the axis along which the photodetector 82 will have its peak or maximum reception sensitivity for any given distance from the photodetector 82. Similarly, the photoemitter 80 has a primary emission axis A2 defined as the axis along which the photoemitter 80 will have its peak or maximum emission intensity for any given distance from the photoemitter 80. According to some embodiments and as illustrated in FIG. 17, the primary reception axis A1 is offset from the primary emission axis A2 in at least some operational configurations of the adjustable dispensing channel subassembly 170. According to some embodiments and as shown, the primary reception axis A1 is laterally offset from the primary emission axis A2 by a distance D3 (i.e., offset a distance perpendicular to the lengthwise direction of the dispensing path at or proximate the sensor pair 80, 82).

According to some embodiments and as illustrated by the dispensing channel subassembly 170 when configured as shown in FIG. 17, the dispensing channel 120 is collectively defined by a first set of opposed walls 172A, 174A that are spaced apart along a first axis C1-C1 and a second set of opposed walls 117, 176 that are spaced apart along a second axis C2-C2 transverse (in some embodiments, perpendicular, as illustrated) to the first axis C1-C1. The photodetector 82 is spaced apart from the photoemitter 80 across the dispensing channel 120 a first linear distance D1 parallel to the first axis C1-C1. The photodetector 82 is offset from the photoemitter 80 a second linear distance D2 parallel to the second axis C2-C2.

According to some embodiments, the dispensing channel 120 is rectangular in cross-section and the sensing area or beam (e.g., the sensing area B2) extends diagonally across all or a part of the dispensing channel 120. In accordance with some embodiments and as illustrated, the photodetector 82 and the photoemitter 80 move with their associated corners of the dispensing channel 120 so that as the dispensing channel subassembly 170 is adjusted, the photodetector 82 and the photoemitter 80 are reconfigured to adjust the angle and length of the diagonally extending sensing beam to the new geometry of the dispensing channel 120.

In some embodiments, the dispensing channel 120 cross-sectional area has a major dimension (e.g., the width dimension W of FIG. 17) on its major axis C2-C2 and a smaller minor dimension (e.g., the height dimension H) on its minor axis C1-C1, and the sensing area (e.g., the sensing area B2) extends diagonally across the dispensing channel 120 at an angle with respect to each of the major and minor dimensions. According to some embodiments, the major and minor dimensions are perpendicular to one another. According to some embodiments, one of the major and minor dimensions is aligned with a vertical axis and the other of the major and minor dimensions is aligned with a horizontal axis.

Figure 18:
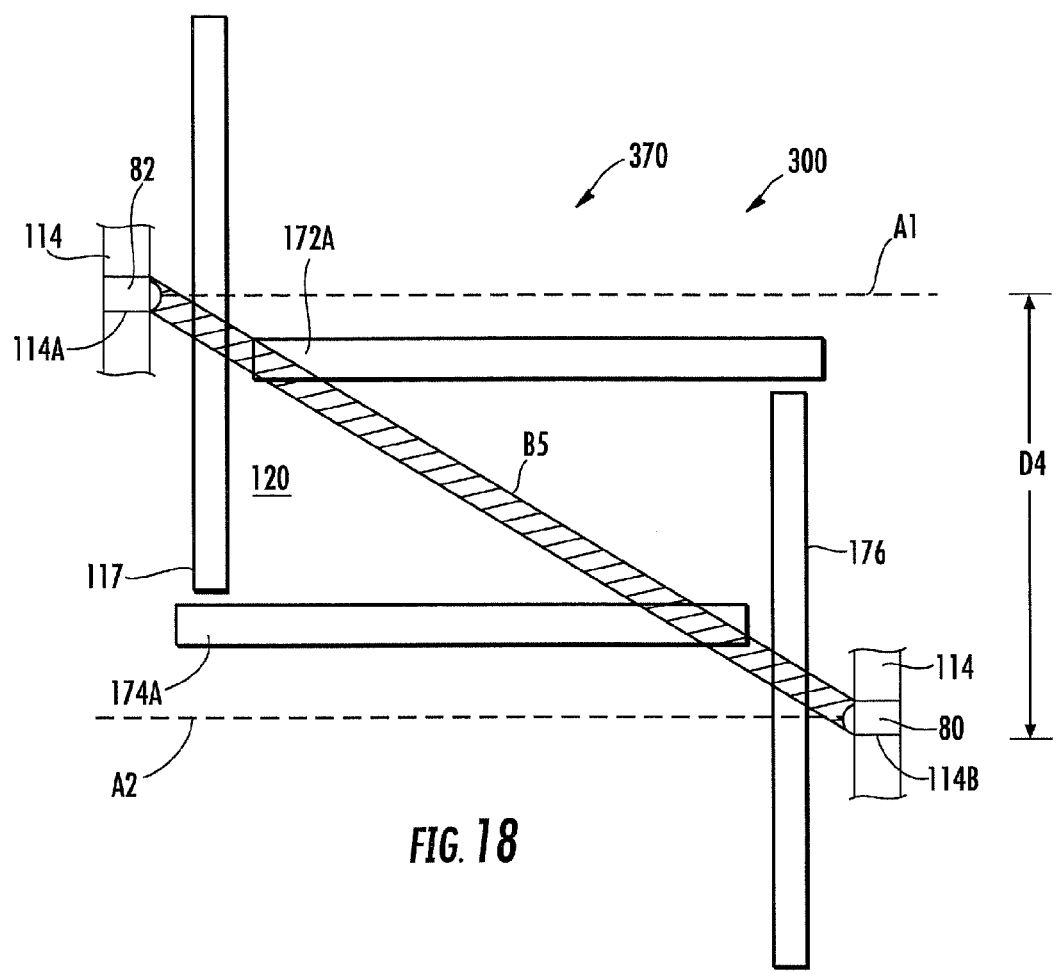
FIG. 18 is a partial, schematic front view of a bin according to further embodiments of the present invention.

With reference to FIG. 18, a partial, schematic front view (i.e., corresponding to the view of FIG. 17) of a bin 300 including an adjustable dispensing channel subassembly 370 according to further embodiments of the present invention is shown therein. The bin 300 may correspond to (i.e., include the various features, components and functionality of) the bin 100 as described herein, except as discussed hereinbelow. The bin 300 may be used in place of and in the same manner as the bin 100 in the dispensing system 40. For the purposes of description, components of the bin 300 corresponding to the components of the bin 100 are designated with the same numerals as used in describing and illustrating the bin 100.

The adjustable dispensing channel subassembly 370 is constructed in the same manner as the adjustable dispensing channel subassembly 170 except that the photodetector 82 and the photoemitter 80 are not mounted in the walls 172A and 174A for movement therewith. Instead, the photodetector 82 and the photoemitter 80 are mounted in respective opposed, vertically offset ports 114A, 114B in the nozzle 114 (which is shown in fragmentary view in FIG. 18; see also FIG. 4, which illustrates potential locations for the ports 114A, 114B). According to some embodiments, the photodetector 82 and the photoemitter 80 are located downstream of, but closely adjacent, the outlet of the dispensing channel 120 and at the same axial location along the length of the dispensing path.

In the bin 300, the photodetector 82 and the photoemitter 80 are fixed in relation to one another. More particularly, the photodetector 82 and the photoemitter 80 do not move with adjustment of the walls 117, 172A, 174A, 176 that define the dispensing channel 120, but are offset with respect to one another. An effective sensing area or beam B5 corresponding to the sensing beams B1, B2, B3, B4 (i.e., the overlap between the emission cone of the photoemitter 80 and the reception cone of the photodetector 82) extends across the dispensing channel 120 and the dispensing path of the tablets.

According to some embodiments, the photodetector 82 and the photoemitter 80 are mounted in diagonal opposition to one another so that the sensing beam B5 extends diagonally across the dispensing channel 120. According to some embodiments and as shown, the dispensing channel 120 is rectangular in cross-section and the sensing beam B5 intersects the dispensing channel 120 adjacent the diagonally opposed corners of the rectangle.

According to some embodiments, the primary reception axis A1 of the photodetector 82 and the primary emission axis A2 of the photoemitter 80 are offset from one another a distance D4 transverse (e.g., perpendicular, as shown) to the lengthwise extent of the dispensing path.

With reference to FIG. 17, a partial, schematic front view (i.e., corresponding to the view of FIG. 17) of a bin 400 according to still further embodiments of the present invention is shown therein. The bin 400 may correspond to the bin 100 except as follows. The bin 400 may be used in place of and in the same manner as the bin 100 in the dispensing system 40.

The bin 400 has a non-adjustable dispensing channel subassembly 470 in place of the adjustable dispensing channel subassembly 170. The dispensing channel subassembly 470 includes relatively fixed walls 472, 474, 476, 478 that define the dispensing channel 120. The photodetector 82 and the photoemitter 80 are mounted in respective ports in the walls 472 and 474. The sensor pair 80, 82 has an effective sensing area or beam B6 that extends across the dispensing channel 120 and the path of the tablets. The photodetector 82 and the photoemitter 80 are offset. The sensing beam B6 extends diagonally across the dispensing channel 120 from adjacent respective diagonally opposed corners of the rectangle as discussed above with reference to FIG. 17 and the bin 100. Likewise, the primary reception and emission cones of the sensor pair 80, 82 are offset from one another a distance transverse to the lengthwise extent of the dispensing path as discussed above with regard to the bin 100.

Figure 20:
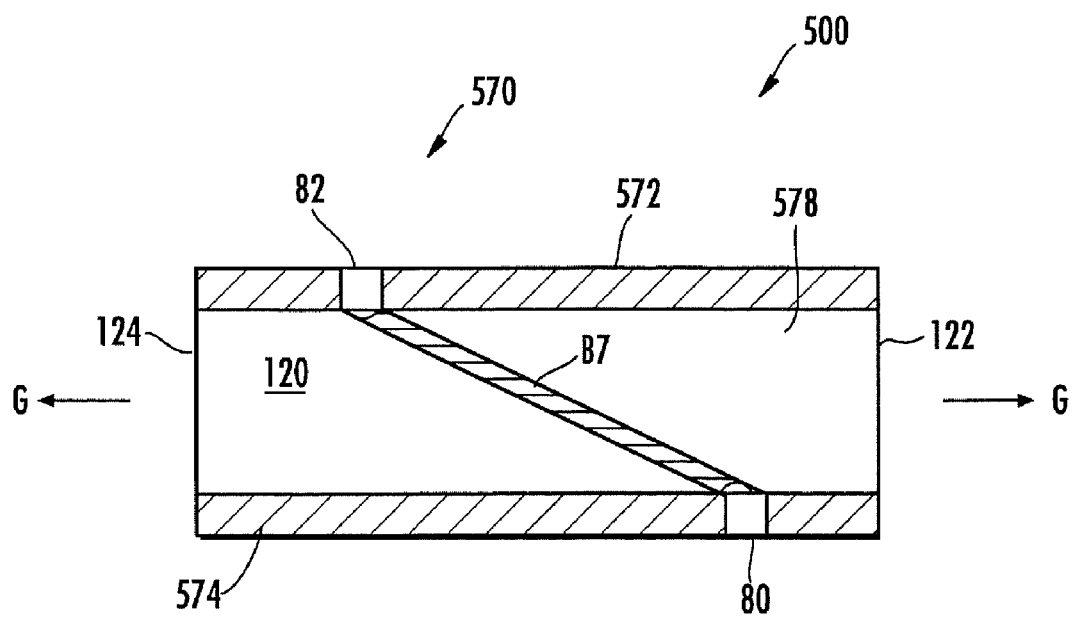
FIG. 20 is a partial, schematic, side cross-sectional view of a bin according to further embodiments of the present invention.

With reference to FIG. 20, a partial, schematic, side cross-sectional view (i.e., corresponding to the view of FIG. 6) of a bin 500 according to still further embodiments of the present invention is shown therein. The bin 500 may correspond to the bin 100 except as follows. The bin 400 may be used in place of and in the same manner as the bin 100 in the dispensing system 40.

The bin 500 has a non-adjustable dispensing channel subassembly 570 in place of the adjustable dispensing channel subassembly 170. The dispensing channel subassembly 570 includes relatively fixed walls 572, 574, 578, and a fixed side wall (not shown) opposite the wall 578 that define the dispensing channel 120. The photodetector 82 and the photoemitter 80 are mounted in respective ports in the walls 472 and 474. The sensor pair 80, 82 has an effective sensing area or beam B7 that extends across the dispensing channel 120 and the path of the tablets. The photodetector 82 and the photoemitter 80 are offset along the dispensing pathway, with the photoemitter 80 nearer the dispensing channel inlet 122 and the photodetector 82 nearer the dispensing channel outlet 124. The sensing beam B7 extends diagonally across the dispensing channel 120 along a lengthwise extent (i.e., with respect to the lengthwise axis G-G or the dispensing path) of the dispensing channel 120. The primary reception and emission cones of the sensor pair 80, 82 are offset from one another a distance transverse to the widthwise extent and the heightwise extent of the dispensing path.

According to further embodiments, the photodetector 82 and the photoemitter 80 of the bin 500 are mounted in relatively movable walls of an adjustable dispensing channel subassembly, and the lengthwise offset of the photodetector 82 and the photoemitter 80 is adjustable by selectively moving the walls. According to further embodiments, the photodetector 82 and the photoemitter 80 of the bin 500 are also offset from one another a distance transverse to the lengthwise extent of the dispensing path as illustrated with regard to the bin 400.

While the sensor system 102 has been described hereinabove with regard to the bin 100 and the dispensing system 40, sensor systems according to embodiments of the present invention may be used with bins and/or systems of other types and configurations. Sensor systems 102 according to embodiments of the present invention may include sensor components differently configured than the sensor components 80, 82, 84, 86.

While embodiments employing gas flow drive mechanisms are described herein, other embodiments of the present invention may employ other drive mechanisms in place of or in addition to gas flow. For example, the pharmaceutical articles may be passed in the forward and/or reverse direction by vibration and/or gravity.

The foregoing is illustrative of the present invention and is not to be construed as limiting thereof. Although a few exemplary embodiments of this invention has been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. An apparatus for dispensing and detecting solid articles, the apparatus comprising:
    a) a housing defining a dispensing channel through which articles can travel along a dispensing pathway; and
    b) a sensor system including:
        a radiation detector positioned along the dispensing pathway; and
        a radiation emitter positioned along the dispensing pathway and configured to direct radiation across the dispensing channel and onto the radiation detector;
        wherein the radiation detector is operative to generate detector signals proportional to the radiation received thereby;
        wherein the radiation detector is offset from the radiation emitter; and
        wherein the radiation emitter and/or the radiation detector are mounted for movement relative to the other.

2. The apparatus of claim 1 wherein the radiation emitter is a photoemitter and the radiation detector is a photodetector.

3. The apparatus of claim 1 wherein the dispensing channel is rectangular in cross-section.

4. The apparatus of claim 3 wherein:
    the radiation detector has a reception field;
    the radiation emitter has an emission field;
    the emission field and the reception field overlap across the dispensing pathway to define a sensing area; and the sensing area extends across the dispensing pathway diagonally with respect to the rectangular cross-section of the dispensing channel.

5. The apparatus of claim 1 wherein:
the radiation detector has a reception field;
the radiation emitter has an emission field;
the emission field and the reception field overlap across the dispensing pathway to define a sensing area;
the dispensing channel has a major dimension and a minor dimension perpendicular to the major dimension, the minor dimension being smaller than the major dimension;
wherein the sensing area extends diagonally across the dispensing channel at an angle with respect to each of the major dimension and minor dimension.

6. The apparatus of claim 1 including a controller configured to adjust a radiation output of the radiation emitter to compensate for the relative positions of the radiation emitter and the radiation detector.

7. The apparatus of claim 1 wherein the apparatus includes a drive mechanism operable to pass the articles along the dispensing pathway such that the articles block radiation from the radiation emitter to the radiation detector as the articles pass along the dispensing pathway.

8. The apparatus of claim 7 wherein the drive mechanism includes a flow generator configured to generate at least one drive gas flow to pass articles along the dispensing pathway such that the articles block radiation to the radiation detector as the articles pass along the dispensing pathway.

9. An apparatus for dispensing and detecting solid articles, the apparatus comprising:
a) a housing defining a dispensing channel through which articles can travel along a dispensing pathway; and
b) a sensor system including:
a radiation detector positioned along the dispensing pathway; and
a radiation emitter positioned along the dispensing pathway and configured to direct radiation across the dispensing channel and onto the radiation detector;
wherein the radiation detector is operative to generate detector signals proportional to the radiation received thereby; and
wherein the radiation detector is offset from the radiation emitter;
wherein:
the housing includes a pair of opposed first walls and a pair of opposed second walls collectively defining the dispensing channel, wherein:
the first walls are spaced apart along a first axis transverse to the dispensing pathway;
the second walls are spaced apart along a second axis transverse to the first axis and the dispensing pathway;
the radiation detector is spaced apart from the radiation emitter across the dispensing channel a first linear distance parallel to the first axis; and
the radiation detector is offset from the radiation emitter a second linear distance parallel to the second axis.

10. The apparatus of claim 9 wherein the radiation detector and the radiation emitter are each mounted on a respective one of the first walls.

11. An apparatus for dispensing and detecting solid articles, the apparatus comprising:
a housing defining a dispensing channel through which articles can travel along a dispensing pathway; and
b) a sensor system including:
a radiation detector positioned along the dispensing pathway; and
a radiation emitter positioned along the dispensing pathway and configured to direct radiation across the dispensing channel and onto the radiation detector;
wherein the radiation detector is operative to generate detector signals proportional to the radiation received thereby; and
wherein the radiation detector is offset from the radiation emitter;
wherein:
the radiation detector has a primary reception axis and a reception field;
the radiation emitter has a primary emission axis and an emission field;
the emission field and the reception field overlap across the dispensing pathway to define a sensing area; and
the primary reception axis and the primary emission axis are offset from one another.

12. The apparatus of claim 11 wherein the primary reception axis and the primary emission axis are offset from one another a distance transverse to a length of the dispensing pathway.

13. The apparatus of claim 11 wherein the primary reception axis and the primary emission axis are offset from one another a distance extending along a length of the dispensing pathway.

14. The apparatus of claim 11 wherein the radiation emitter and/or the radiation detector are mounted for movement relative to the other.

15. A method for dispensing and detecting solid articles, the method comprising:
providing an apparatus including:
a housing defining a dispensing channel through which articles can travel along a dispensing pathway; and
a sensor system including:
a radiation detector positioned along the dispensing pathway; and
a radiation emitter positioned along the dispensing pathway and configured to direct radiation across the dispensing channel and onto the radiation detector;
wherein the radiation detector is operative to generate detector signals proportional to the radiation received thereby; and
wherein the radiation detector is offset from the radiation emitter;
and
passing the articles along the dispensing pathway such that the articles block radiation from the radiation emitter to the radiation detector as the articles pass along the dispensing pathway;
wherein:
the radiation detector has a primary reception axis and a reception field;
the radiation emitter has a primary emission axis and an emission field;
the emission field and the reception field overlap across the dispensing pathway to define a sensing area; and
the primary reception axis and the primary emission axis are offset from one another.

16. The method of claim 15 wherein the radiation emitter is a photoemitter and the radiation detector is a photodetector.

17. The method of claim 15 wherein the articles are pharmaceutical articles.

18. A method for detecting solid articles using an apparatus including a sensor system, the sensor system including a radiation detector and a radiation emitter configured to direct radiation onto the radiation detector, the radiation detector being operative to generate detector signals proportional to the radiation received thereby, the method comprising:

executing a first counting session including passing the articles along a dispensing pathway of the apparatus such that the articles block radiation from the radiation emitter to the radiation detector as the articles pass along the dispensing pathway; thereafter moving the radiation emitter and/or the radiation detector relative to the other; thereafter executing a second counting session including passing the articles along the dispensing pathway of the apparatus such that the articles block radiation from the radiation emitter to the radiation detector as the articles pass along the dispensing pathway; and recalibrating the sensor system between the first and second counting sessions by automatically adjusting the radiation output of the radiation emitter to compensate for a change in the amount of radiation incident on the radiation detector from the radiation emitter caused by moving the radiation emitter and/or the radiation detector relative to the other.

19. The method of claim 18 wherein the radiation emitter is a photoemitter and the radiation detector is a photodetector.

20. The method of claim 18 wherein the articles are pharmaceutical articles.

21. The method of claim 18 including calibrating the sensor system by adjusting an energy level supply to the radiation emitter to generate a reference signal from the radiation detector at a level within a prescribed reference level range.

22. The method of claim 18 including:
monitoring the detector signals to determine a reference signal level;
determining a threshold signal level as a function of the reference signal level;
identifying the detector signals that are event signals with respect to the threshold signal level; and
using the event signals to detect, count and/or characterize the articles passed along the dispensing pathway.

23. The method of claim 22 including:
providing the detector signals as digital detector signals; and
digitally processing the event signals to detect, count and/or characterize the articles passed along the dispensing pathway.

24. The method of claim 18 wherein the apparatus includes at least first and second walls defining a dispensing channel, at least one of the first and second walls is movable relative to the other, the radiation detector is mounted on the first wall, and the radiation emitter is mounted on the second wall.

25. The method of claim 18 wherein:
the apparatus includes a housing defining the dispensing pathway;
the radiation detector is positioned along the dispensing pathway and has a primary reception axis and a reception field;
the radiation emitter is positioned along the dispensing pathway and has a primary emission axis and an emission field;
the emission field and the reception field overlap across the dispensing pathway to define a sensing area; and
the primary reception axis and the primary emission axis are offset from one another a distance transverse to the dispensing pathway.

26. A method for detecting solid articles using an apparatus including a sensor system, the sensor system including a radiation detector and a radiation emitter configured to direct radiation onto the radiation detector, the radiation detector being operative to generate detector signals proportional to the radiation received thereby, the method comprising:

moving the radiation emitter and/or the radiation detector relative to the other; and generating at least one drive gas flow using a flow generator to force articles along a dispensing pathway of the apparatus such that the articles block radiation to the radiation detector as the articles travel along the dispensing pathway.

27. A method for detecting solid articles using an apparatus including a sensor system, the sensor system including a radiation detector and a radiation emitter configured to direct radiation onto the radiation detector, the radiation detector being operative to generate detector signals proportional to the radiation received thereby, the method comprising:

moving the radiation emitter and/or the radiation detector relative to the other;

wherein the apparatus includes at least first and second walls defining a dispensing channel, at least one of the first and second walls is movable relative to the other, the radiation detector is mounted on the first wall, and the radiation emitter is mounted on the second wall;

wherein the apparatus includes a housing; and wherein moving the radiation emitter and/or the radiation detector relative to the other includes moving the first wall relative to the housing along a first axis and moving the second wall relative to the housing along a second axis transverse to the first axis.

28. The method of claim 27 further including adjusting a radiation output of the radiation emitter to compensate for the relative positions of the radiation emitter and the radiation detector.

29. The method of claim 28 including adjusting the radiation output of the radiation emitter to compensate for a change in the amount of radiation incident on the radiation detector from the radiation emitter caused by moving the radiation emitter and/or the radiation detector relative to the other.

30. The method of claim 28 including passing the articles along a dispensing pathway of the apparatus such that the articles block radiation from the radiation emitter to the radiation detector as the articles pass along the dispensing pathway.

31. The method of claim 30 including:
executing a first counting session including passing the articles along a dispensing pathway of the apparatus such that the articles block radiation from the radiation emitter to the radiation detector as the articles pass along the dispensing pathway; thereafter
moving the radiation emitter and/or the radiation detector relative to the other; thereafter
executing a second counting session including passing the articles along the dispensing pathway of the apparatus such that the articles block radiation from the radiation emitter to the radiation detector as the articles pass along the dispensing pathway; and
recalibrating the sensor system between the first and second counting sessions by automatically adjusting the radiation output of the radiation emitter to compensate for a change in the amount of radiation incident on the radiation detector from the radiation emitter caused by moving the radiation emitter and/or the radiation detector relative to the other.

32. The method of claim 27 wherein the second axis is perpendicular to the first axis.

33. An apparatus for detecting solid articles, the apparatus comprising:
   a sensor system including a radiation detector and a radiation emitter configured to direct radiation onto the radiation detector; and
   a flow generator configured to generate at least one drive gas flow to pass articles along a dispensing pathway of the apparatus such that the articles block radiation to the radiation detector as the articles pass along the dispensing pathway;
   wherein the radiation detector is operative to generate detector signals proportional to the radiation received thereby; and
   wherein the radiation emitter and/or the radiation detector are mounted for movement relative to the other.

34. The apparatus of claim 33 wherein the radiation emitter is a photoemitter and the radiation detector is a photodetector.

35. The apparatus of claim 33 including a controller configured to adjust a radiation output of the radiation emitter to compensate for the relative positions of the radiation emitter and the radiation detector.

36. The apparatus of claim 35 wherein the controller is configured to adjust the radiation output of the radiation emitter to compensate for a change in the amount of radiation incident on the radiation detector from the radiation emitter caused by moving the radiation emitter and/or the radiation detector relative to the other.

37. The apparatus of claim 33 wherein the controller is configured to calibrate the sensor system by adjusting an energy level supply to the radiation emitter to generate a reference signal from the radiation detector at a level within a prescribed reference level range.

38. The apparatus of claim 33 wherein the controller is configured to:
   monitor the detector signals to determine a reference signal level;
   determine a threshold signal level as a function of the reference signal level;
   identify the detector signals that are event signals with respect to the threshold signal level; and
   use the event signals to detect, count and/or characterize the articles passed along the dispensing pathway.

39. The apparatus of claim 38 wherein:
   the radiation detector is further configured to provide the detector signals as digital detector signals; and
   the controller is further configured to digitally process the event signals to detect, count and/or characterize the articles passing along the dispensing pathway.

40. The apparatus of claim 33 including at least first and second walls defining a dispensing channel and wherein:
   at least one of the first and second walls is movable relative to the other;
   the radiation detector is mounted on the first wall; and
   the radiation emitter is mounted on the second wall.

41. An apparatus for detecting solid articles, the apparatus comprising:
   a sensor system including a radiation detector and a radiation emitter configured to direct radiation onto the radiation detector, wherein:
      the radiation detector is operative to generate detector signals proportional to the radiation received thereby; and
      the radiation emitter and/or the radiation detector are mounted for movement relative to the other;
   a controller configured to adjust a radiation output of the radiation emitter to compensate for the relative positions of the radiation emitter and the radiation detector;
   a drive mechanism operable to pass the articles along a dispensing pathway defined by the apparatus such that the articles block radiation from the radiation emitter to the radiation detector as the articles pass along the dispensing pathway;
   wherein the controller is configured to:
      execute a first counting session including passing the articles along the dispensing pathway of the apparatus such that the articles block radiation from the radiation emitter to the radiation detector as they pass along the dispensing pathway; thereafter
      execute a second counting session including passing the articles along the dispensing pathway of the apparatus such that the articles block radiation from the radiation emitter to the radiation detector as they pass along the dispensing pathway; and
      recalibrate the sensor system between the first and second counting sessions by automatically adjusting the radiation output of the radiation emitter to compensate for a change in the amount of radiation incident on the radiation detector from the radiation emitter caused by moving the radiation emitter and/or the radiation detector relative to the other.

42. The apparatus of claim 41 wherein the drive mechanism includes a flow generator configured to generate at least one drive gas flow to pass articles along the dispensing pathway of the apparatus such that the articles block radiation to the radiation detector as the articles pass along the dispensing pathway.

43. An apparatus for detecting
   a sensor system including a radiation detector and a radiation emitter configured to direct radiation onto the radiation detector, wherein:
      the radiation detector is operative to generate detector signals proportional to the radiation received thereby; and
      the radiation emitter and/or the radiation detector are mounted for movement relative to the other;
   at least first and second walls defining a dispensing channel, wherein:
      at least one of the first and second walls is movable relative to the other;
      the radiation detector is mounted on the first wall; and
      the radiation emitter is mounted on the second wall; and
   a housing, wherein the first wall is movable relative to the housing along a first axis and the second wall is movable relative to the housing along a second axis transverse to the first axis.

44. The apparatus of claim 43 wherein the second axis is perpendicular to the first axis.

45. The apparatus of claim 43 wherein:
   the apparatus includes a housing defining a dispensing pathway;
   the radiation detector is positioned along the dispensing pathway and has a primary reception axis and a reception field;
   the radiation emitter is positioned along the dispensing pathway and has a primary emission axis and an emission field;
   the emission field and the reception field overlap across the dispensing pathway to define a sensing area; and
   the primary reception axis and the primary emission axis are offset from one another a distance transverse to the dispensing pathway.

* * * * *

UNITED STATES PATENT AND TRADEMARK OFFICE
CERTIFICATE OF CORRECTION

PATENT NO.      : 7,949,427 B2
APPLICATION NO. : 12/052301
DATED           : May 24, 2011
INVENTOR(S)     : Mitchelli et al.

Page 1 of 1

It is certified that error appears in the above-identified patent and that said Letters Patent is hereby corrected as shown below:

In the Claims:

Column 21, Claim 11, Line 63: Please correct "a housing" to read -- a) a housing --

Column 26, Claim 43, Line 30: Please correct "An apparatus for detecting" to read -- An apparatus for detecting solid articles, the apparatus comprising --

Signed and Sealed this
Eighth Day of November, 2011

David J. Kappos
*Director of the United States Patent and Trademark Office*